United States Patent
Gutman et al.

(10) Patent No.: US 11,799,541 B1
(45) Date of Patent: Oct. 24, 2023

(54) REPEATER DIGITAL PROCESSING MODES

(71) Applicant: QUALCOMM Incorporated, San Diego, CA (US)

(72) Inventors: Igor Gutman, Hod HaSharon (IL); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/934,790

(22) Filed: Sep. 23, 2022

(51) Int. Cl.
| | |
|---|---|
| *H04B 7/155* | (2006.01) |
| *H04W 76/15* | (2018.01) |
| *H04W 72/51* | (2023.01) |

(52) U.S. Cl.
CPC ........ *H04B 7/15557* (2013.01); *H04W 72/51* (2023.01); *H04W 76/15* (2018.02)

(58) Field of Classification Search
CPC ... H04B 7/15557; H04W 72/51; H04W 76/15
See application file for complete search history.

(56) References Cited

U.S. PATENT DOCUMENTS

| | | | | |
|---|---|---|---|---|
| 2011/0151778 A1* | 6/2011 | Lim | ................... | H04B 7/15542 455/24 |
| 2016/0014705 A1* | 1/2016 | Tani | ..................... | H04B 1/1036 370/252 |
| 2017/0366209 A1* | 12/2017 | Weissman | ................ | H04L 27/38 |
| 2020/0358518 A1* | 11/2020 | Tarighat Mehrabani | ..................... | H04B 7/15542 |
| 2020/0366254 A1* | 11/2020 | Seo | .......... | H04L 27/01 |
| 2020/0367257 A1* | 11/2020 | Hormis | ................. | H04L 25/022 |
| 2021/0044412 A1* | 2/2021 | Li | .......... | H04W 80/02 |
| 2021/0075497 A1* | 3/2021 | Tekgul | .................... | H04W 8/22 |
| 2021/0391853 A1* | 12/2021 | Jann | ...................... | H03M 1/502 |
| 2022/0046637 A1* | 2/2022 | Abedini | .................. | H04W 8/24 |
| 2022/0182020 A1* | 6/2022 | Yu | ........................... | H04B 1/715 |
| 2022/0201603 A1* | 6/2022 | Klein | ....................... | H04B 1/18 |
| 2022/0345193 A1* | 10/2022 | Braun | ................. | H04B 7/0413 |

OTHER PUBLICATIONS

H. Gandhi and W. Abbott, "A digital signal processing solution for PA linearization and RF impairment correction for multi-standard wireless transceiver systems," The 40th European Microwave Conference, Paris, France, 2010, pp. 719-722, doi: 10.23919/EUMC.2010.5616529. (Year: 2010).*

* cited by examiner

*Primary Examiner* — Gary Mui
(74) *Attorney, Agent, or Firm* — Harrity & Harrity, LLP

(57) ABSTRACT

Various aspects of the present disclosure generally relate to wireless communication. In some aspects, a repeater may transmit an indication of a set of candidate digital processing modes supported by the repeater, the set of candidate digital processing modes including a digital processing mode that includes one or more impairment correction operations. The repeater may receive an indication of a selection of a digital processing mode, of the set of candidate digital processing modes, for one or more communications. Numerous other aspects are described.

28 Claims, 11 Drawing Sheets

REPEATER DIGITAL PROCESSING MODES

FIELD OF THE DISCLOSURE

Aspects of the present disclosure generally relate to wireless communication and to techniques and apparatuses for repeater digital processing modes.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a repeater. The method may include transmitting an indication of a set of candidate digital processing modes supported by the repeater, the set of candidate digital processing modes including a digital processing mode that includes one or more impairment correction operations, the one or more impairment correction operations comprising one or more of: direct current (DC) offset removal from a received signal, DC offset removal from a transmitted signal, gain control associated with a reception low-noise amplifier (LNA), gain control associated with a transmission LNA, droop correction of the received signal, droop correction of the transmitted signal, frequency domain residual side band (FDRSB) correction of the received signal, FDRSB correction of the transmitted signal, peak-to-average-peak-ratio reduction of the transmitted signal, or digital pre-distortion correction of the transmitted signal. The method may include receiving an indication of a selection of a digital processing mode, of the set of candidate digital processing modes, for one or more communications.

Some aspects described herein relate to a method of wireless communication performed by a network node. The method may include receiving an indication of a set of candidate digital processing modes supported by a repeater, the set of candidate digital processing modes including a digital processing mode that includes one or more impairment correction operations, the one or more impairment correction operations comprising one or more of: DC offset removal from a received signal, DC offset removal from a transmitted signal, gain control associated with a reception LNA, gain control associated with a transmission LNA, droop correction of the received signal, droop correction of the transmitted signal, FDRSB correction of the received signal, FDRSB correction of the transmitted signal, peak-to-average-peak-ratio reduction of the transmitted signal, or digital pre-distortion correction of the transmitted signal. The method may include transmitting an indication of a selection of a digital processing mode, of the set of candidate digital processing modes, for one or more communications.

Some aspects described herein relate to a repeater for wireless communication. The user equipment may include a memory and one or more processors coupled to the memory. The one or more processors may be configured to transmit an indication of a set of candidate digital processing modes supported by the repeater, the set of candidate digital processing modes including a digital processing mode that includes one or more impairment correction operations, the one or more impairment correction operations comprising one or more of: DC offset removal from a received signal, DC offset removal from a transmitted signal, gain control associated with a reception LNA, gain control associated with a transmission LNA, droop correction of the received signal, droop correction of the transmitted signal, FDRSB correction of the received signal, FDRSB correction of the transmitted signal, peak-to-average-peak-ratio reduction of the transmitted signal, or digital pre-distortion correction of the transmitted signal. The one or more processors may be configured to receive an indication of a selection of a digital processing mode, of the set of candidate digital processing modes, for one or more communications.

Some aspects described herein relate to a network node for wireless communication. The network node may include a memory and one or more processors coupled to the memory. The one or more processors may be configured to receive an indication of a set of candidate digital processing modes supported by a repeater, the set of candidate digital processing modes including a digital processing mode that includes one or more impairment correction operations, the one or more impairment correction operations comprising one or more of: DC offset removal from a received signal, DC offset removal from a transmitted signal, gain control associated with a reception LNA, gain control associated with a transmission LNA, droop correction of the received signal, droop correction of the transmitted signal, FDRSB correction of the received signal, FDRSB correction of the transmitted signal, peak-to-average-peak-ratio reduction of the transmitted signal, or digital pre-distortion correction of the transmitted signal. The one or more processors may be configured to transmit an indication of a selection of a digital processing mode, of the set of candidate digital processing modes, for one or more communications.

Some aspects described herein relate to a non-transitory computer-readable medium that stores a set of instructions for wireless communication by a repeater. The set of instructions, when executed by one or more processors of the UE, may cause the UE to transmit an indication of a set of candidate digital processing modes supported by the repeater, the set of candidate digital processing modes including a digital processing mode that includes one or more impairment correction operations, the one or more impairment correction operations comprising one or more of: DC offset removal from a received signal, DC offset removal from a transmitted signal, gain control associated with a reception LNA, gain control associated with a transmission LNA, droop correction of the received signal, droop correction of the transmitted signal, FDRSB correction of the received signal, FDRSB correction of the transmitted signal, peak-to-average-peak-ratio reduction of the transmitted signal, or digital pre-distortion correction of the transmitted signal. The set of instructions, when executed by one or more processors of the UE, may cause the UE to receive an indication of a selection of a digital processing mode, of the set of candidate digital processing modes, for one or more communications.

Some aspects described herein relate to a non-transitory computer-readable medium that stores a set of instructions for wireless communication by a network node. The set of instructions, when executed by one or more processors of the network node, may cause the network node to receive an indication of a set of candidate digital processing modes supported by a repeater, the set of candidate digital processing modes including a digital processing mode that includes one or more impairment correction operations, the one or more impairment correction operations comprising one or more of: DC offset removal from a received signal, DC offset removal from a transmitted signal, gain control associated with a reception LNA, gain control associated with a transmission LNA, droop correction of the received signal, droop correction of the transmitted signal, FDRSB correction of the received signal, FDRSB correction of the transmitted signal, peak-to-average-peak-ratio reduction of the transmitted signal, or digital pre-distortion correction of the transmitted signal. The set of instructions, when executed by one or more processors of the network node, may cause the network node to transmit an indication of a selection of a digital processing mode, of the set of candidate digital processing modes, for one or more communications.

Some aspects described herein relate to an apparatus for wireless communication. The apparatus may include means for transmitting an indication of a set of candidate digital processing modes supported by the apparatus, the set of candidate digital processing modes including a digital processing mode that includes one or more impairment correction operations, the one or more impairment correction operations comprising one or more of: DC offset removal from a received signal, DC offset removal from a transmitted signal, gain control associated with a reception LNA, gain control associated with a transmission LNA, droop correction of the received signal, droop correction of the transmitted signal, FDRSB correction of the received signal, FDRSB correction of the transmitted signal, peak-to-average-peak-ratio reduction of the transmitted signal, or digital pre-distortion correction of the transmitted signal. The apparatus may include means for receiving an indication of a selection of a digital processing mode, of the set of candidate digital processing modes, for one or more communications.

Some aspects described herein relate to an apparatus for wireless communication. The apparatus may include means for receiving an indication of a set of candidate digital processing modes supported by a repeater, the set of candidate digital processing modes including a digital processing mode that includes one or more impairment correction operations, the one or more impairment correction operations comprising one or more of: DC offset removal from a received signal, DC offset removal from a transmitted signal, gain control associated with a reception LNA, gain control associated with a transmission LNA, droop correction of the received signal, droop correction of the transmitted signal, FDRSB correction of the received signal, FDRSB correction of the transmitted signal, peak-to-average-peak-ratio reduction of the transmitted signal, or digital pre-distortion correction of the transmitted signal. The apparatus may include means for transmitting an indication of a selection of a digital processing mode, of the set of candidate digital processing modes, for one or more communications.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
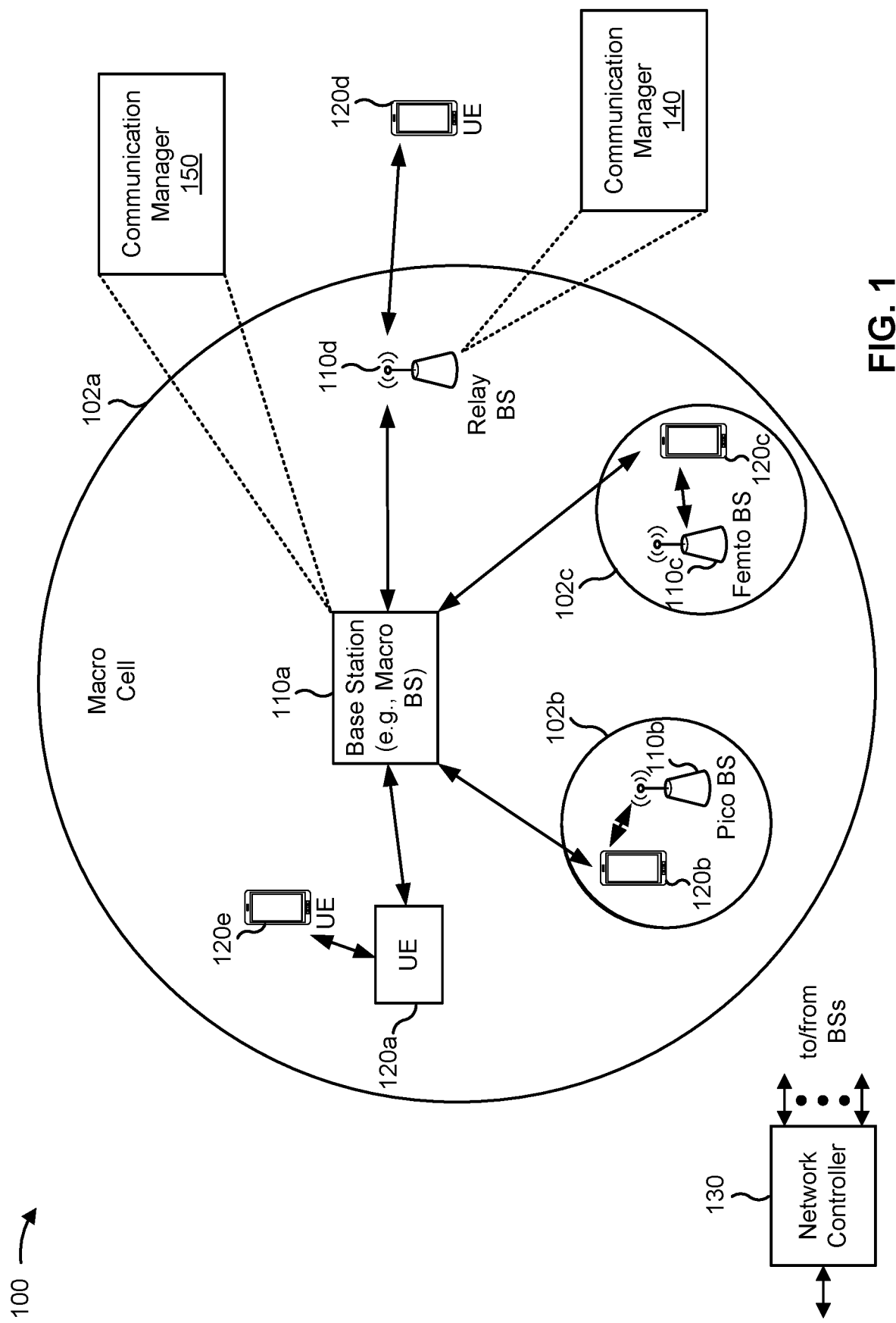
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the repeater may include a communication manager 140. As described in more detail elsewhere herein, the communication manager 140 may transmit an indication of a set of candidate digital processing modes supported by the repeater, the set of candidate digital processing modes including a digital processing mode that includes one or more impairment correction operations, the one or more impairment correction operations comprising one or more of: DC offset removal from a received signal, DC offset removal from a transmitted signal, gain control associated with a reception LNA, gain control associated with a transmission LNA, droop correction of the received signal, droop correction of the transmitted signal, FDRSB correction of the received signal, FDRSB correction of the transmitted signal, peak-to-average-peak-ratio reduction of the transmitted signal, or digital pre-distortion correction of the transmitted signal; and receive an indication of a selection of a digital processing mode, of the set of candidate digital processing modes, for one or more communications. Additionally, or alternatively, the communication manager 140 may perform one or more other operations described herein.

In some aspects, the network node 110 may include a communication manager 150. As described in more detail elsewhere herein, the communication manager 150 may receive an indication of a set of candidate digital processing modes supported by a repeater, the set of candidate digital processing modes including a digital processing mode that includes one or more impairment correction operations, the one or more impairment correction operations comprising one or more of: DC offset removal from a received signal, DC offset removal from a transmitted signal, gain control associated with a reception LNA, gain control associated with a transmission LNA, droop correction of the received signal, droop correction of the transmitted signal, FDRSB correction of the received signal, FDRSB correction of the transmitted signal, peak-to-average-peak-ratio reduction of the transmitted signal, or digital pre-distortion correction of the transmitted signal; and transmit an indication of a selection of a digital processing mode, of the set of candidate digital processing modes, for one or more communications. Additionally, or alternatively, the communication manager 150 may perform one or more other operations described herein.

As indicated above, FIG. 1 is provided as an example. Other examples may differ from what is described with regard to FIG. 1.

Figure 2:
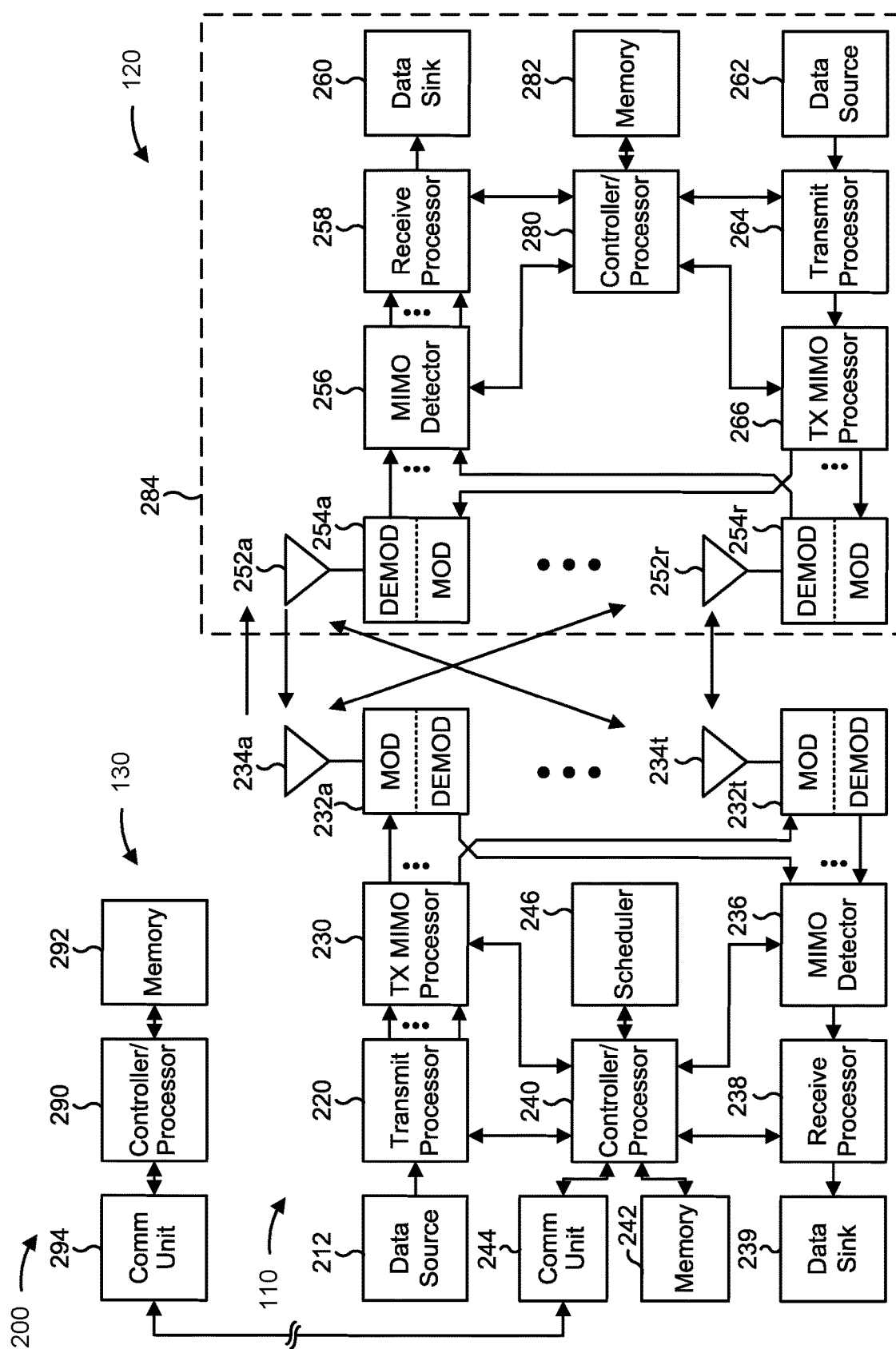
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-11).

The controller/processor 240 of the network node 110, the controller/processor 280 of the UE 120, and/or any other component(s) of FIG. 2 may perform one or more techniques associated with repeater digital processing modes, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the repeater includes means for transmitting an indication of a set of candidate digital processing modes supported by the repeater, the set of candidate digital processing modes including a digital processing mode that includes one or more impairment correction operations, the one or more impairment correction operations comprising one or more of: DC offset removal from a received signal, DC offset removal from a transmitted signal, gain control associated with a reception LNA, gain control associated with a transmission LNA, droop correction of the received signal, droop correction of the transmitted signal, FDRSB correction of the received signal, FDRSB correction of the transmitted signal, peak-to-average-peak-ratio reduction of the transmitted signal, or digital pre-distortion correction of the transmitted signal; and/or means for receiving an indication of a selection of a digital processing mode, of the set of candidate digital processing modes, for one or more communications. In some aspects, the means for the repeater to perform operations described herein may include, for example, components associated with a network node, such as one or more of communication manager 150, transmit processor 220, TX MIMO processor 230, modem 232, antenna 234, MIMO detector 236, receive processor 238, controller/processor 240, memory 242, or scheduler 246. In some aspects, the means for the repeater to perform operations described herein may include, for example, components associated with a UE, such as one or more of communication manager 140, antenna 252, modem 254, MIMO detector 256, receive processor 258, transmit processor 264, TX MIMO processor 266, controller/processor 280, or memory 282.

In some aspects, the network node includes means for receiving an indication of a set of candidate digital processing modes supported by a repeater, the set of candidate digital processing modes including a digital processing mode that includes one or more impairment correction operations, the one or more impairment correction operations comprising one or more of: DC offset removal from a received signal, DC offset removal from a transmitted signal, gain control associated with a reception LNA, gain control associated with a transmission LNA, droop correction of the received signal, droop correction of the transmitted signal, FDRSB correction of the received signal, FDRSB correction of the transmitted signal, peak-to-average-peak-ratio reduction of the transmitted signal, or digital pre-distortion correction of the transmitted signal; and/or means for transmitting an indication of a selection of a digital processing mode, of the set of candidate digital processing modes, for one or more communications. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
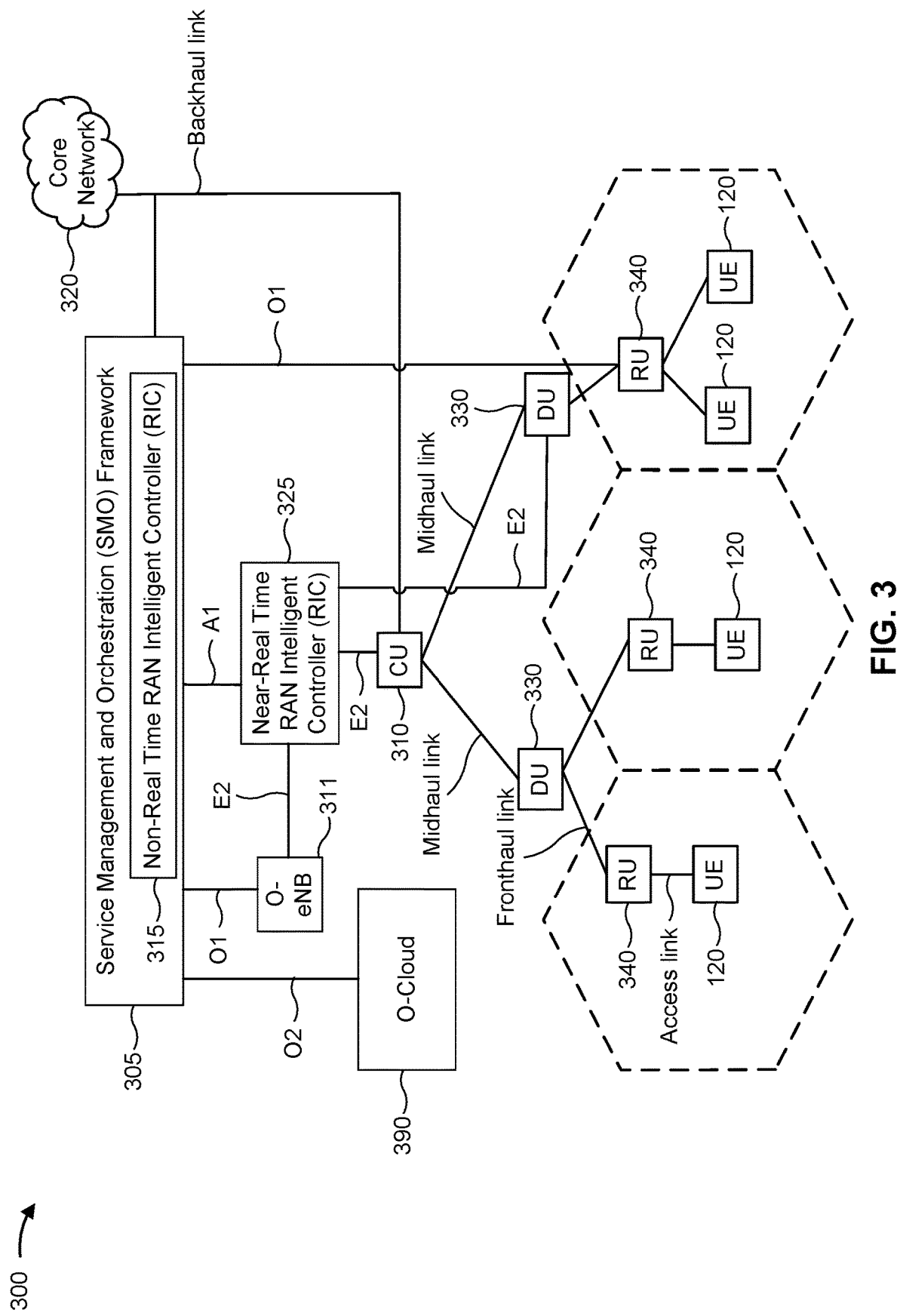
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit—User Plane (CU-UP) functionality), control plane functionality (for example, Central Unit—Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
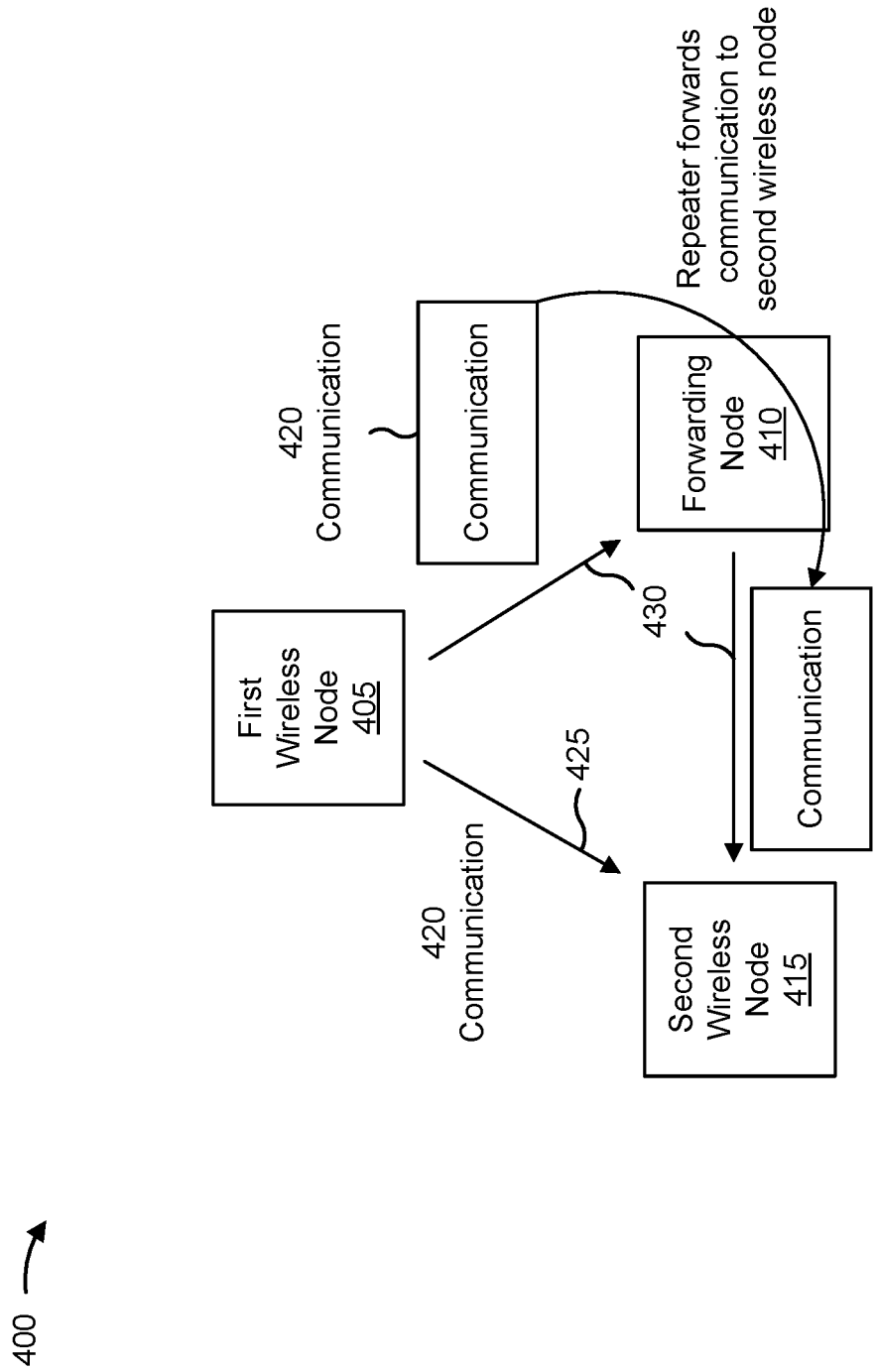
FIG. 4 is a diagram illustrating an example of a forwarding node (e.g., a repeater or a relay node) that forwards communications between a first wireless node and a second wireless node, in accordance with the present disclosure.

FIG. 4 is a diagram illustrating an example 400 of a forwarding node (e.g., a repeater or a relay node) that forwards communications between a first wireless node and a second wireless node, in accordance with the present disclosure. As shown, example 400 includes a first wireless node 405 (e.g., an IAB node, an IAB donor, a network node 110, a UE 120, and/or the like), a forwarding node 410 (e.g., a repeater device, a relay device, a network node 110, a UE 120, a millimeter wave (mmWave) repeater, a mmWave relay, a digital repeater, an analog repeater, a digital relay, an analog relay, and/or the like), and a second wireless node 415 (e.g., an IAB node, an IAB donor, a network node 110, a UE 120, another forwarding node 410, and/or the like). In some aspects, the first wireless node 405 and/or the second wireless node 415 may be aware of the forwarding node 410. In some aspects, the first wireless node 405 and/or the second wireless node 415 may be unaware of the forwarding node 410.

As shown in FIG. 4, the first wireless node 405 may have a communication 420 (e.g., a data communication, a control communication, and/or the like) to transmit to the second wireless node 415 using a direct link 425 (e.g., an access link and/or the like) between the first wireless node 405 and the second wireless node 415. However, the first wireless node 405 may be unable to transmit the communication 420 to the second wireless node 415 using the direct link 425. For example, the second wireless node 415 may be outside of a transmit range of the first wireless node 405, the direct link 425 may be blocked, and/or the like.

Therefore, the first wireless node 405 may communicate with the second wireless node 415 using an indirect link 430. For example, the first wireless node 405 may transmit the communication 420 to the forwarding node 410. In some aspects, the first wireless node 405 may transmit the communication 420 directly to the forwarding node 410 (e.g., in a case where the first wireless node 405 is aware of the forwarding node 410). In some aspects, the forwarding node 410 may be configured (e.g., by a control node, by the second wireless node 415, and/or the like) to receive the communication 420 from the first wireless node 405 (e.g., in a case where the first wireless node 405 is unaware of the forwarding node 410).

As shown in FIG. 4, the communication 420 may arrive at the forwarding node 410 and be forwarded by the forwarding node 410. In some aspects, the forwarding node 410 is a repeater (or repeater unit), and the repeater may regenerate a signal of the communication 420. For example, the repeater may receive a signal of the communication 420, extract tones from the signal, regenerate the signal based at least in part on the extracted tones, and transmit the regenerated signal. In some aspects, the forwarding node 410 is a relay node (or relay unit), and the relay node may generate a new signal based at least in part on a signal of the communication 420. For example, the relay node may receive a downlink signal that carries information associated with a communication (e.g., in-phase and quadrature (IQ) samples), generate a new signal based at least in part on the information, and transmit the new signal. As another example, the relay node may receive an uplink signal, generate a new signal that carries information associated with the uplink signal (e.g., IQ samples), and transmit the new signal.

In some cases, the indirect link 430 may be an access link, a side link, or a fronthaul link. For example, if the first wireless node 405 is a network node 110 and the second wireless node 415 is a UE 120, the indirect link 430 between the first wireless node 405 and the forwarding node 410 may be a fronthaul link. The indirect link 430 between the forwarding node 410 and the second wireless node 415 may be an access link. Using the communication scheme shown in FIG. 4 may improve network performance and increase reliability by providing the first wireless node 405 and/or the second wireless node 415 with link diversity for communications, by extending a communication coverage area of the first wireless node 405 and/or the second wireless node 415, and/or the like.

As indicated above, FIG. 4 is provided as an example. Other examples may differ from what is described with respect to FIG. 4.

Figure 5:
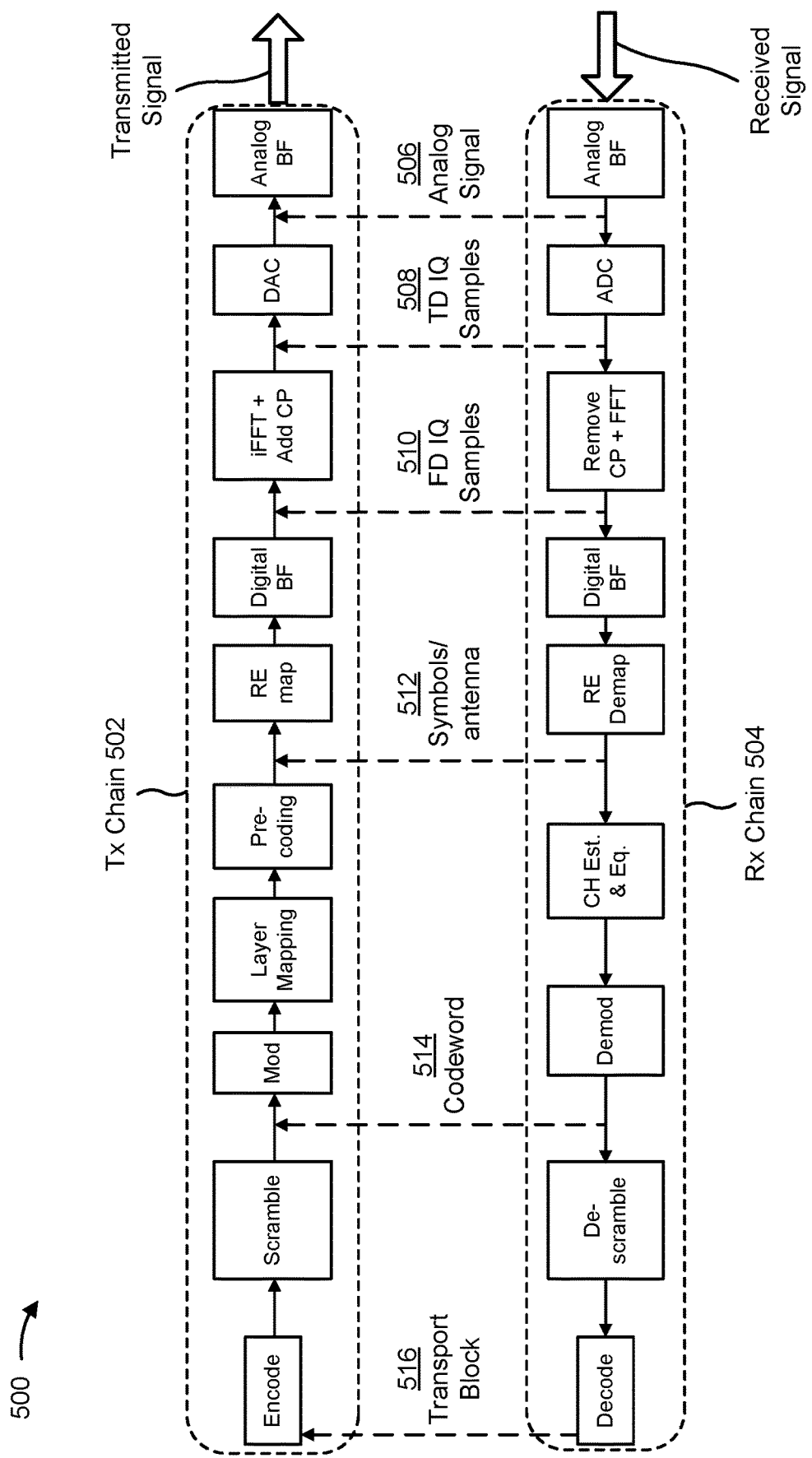
FIG. 5 is a diagram illustrating an example of a transmit (Tx) chain and a receive (Rx) chain of a forwarding node implemented as a repeater, in accordance with the present disclosure.

FIG. 5 is a diagram illustrating an example 500 of a transmit (Tx) chain 502 and a receive (Rx) chain 504 of a forwarding node implemented as a repeater, in accordance with the present disclosure.

In some examples, one or more components of Tx chain 502 may be implemented in transmit processor 220, TX MIMO processor 230, MOD/DEMOD 232, controller/processor 240, and/or the like, as described above in connection with FIG. 2. In some examples, Tx chain 502 may be implemented in a repeater for transmitting an outgoing signal (e.g., uplink data, downlink data, an uplink reference signal, a downlink reference signal, uplink control information, downlink control information, and/or the like) associated with a repeating operation performed by the repeater.

In some examples, one or more components of Rx chain 504 may be implemented in receive processor 238, MIMO detector 236, MOD/DEMOD 232, controller/processor 240, and/or the like, as described above in connection with FIG. 2. In some examples, Rx chain 504 may be implemented in a repeater for receiving an incoming signal (e.g., downlink data, uplink data, a downlink reference signal, an uplink reference signal, downlink control information, uplink control information, and/or the like) associated with a repeating operation performed by the repeater.

As shown in FIG. 5 and example 500, the incoming signal may be a downlink signal that is received over a fronthaul link from a DU of an IAB node, a network node 110, and/or the like, and the outgoing signal may be a regenerated version of the downlink signal that is transmitted over an access link to a mobile termination (MT) unit of an IAB node, a UE 120, and/or the like. Additionally, or alternatively, the incoming signal may be an uplink signal that is received over an access link from an MT unit of an IAB node, a UE 120, and/or the like, and the outgoing signal may be a regenerated version of the uplink signal that is transmitted over a fronthaul link to a DU of an IAB node, a network node 110, and/or the like. Accordingly, as described herein, repeating operations performed by the repeater may be symmetric for downlink and uplink signals. Furthermore, in some examples, the device transmitting the incoming signal and/or the device receiving the outgoing signal may be unaware of the repeater (e.g., the repeating operations may be transparent to the transmitting device and/or the receiving device).

As shown in FIG. 5, the incoming signal may be processed by the Rx chain 504. For example, as described herein, the repeater may perform different levels of analog and/or digital processing to regenerate the incoming signal as the outgoing signal. The level of processing performed by the repeater may be based at least in part on a configuration received by the repeater (e.g., from a control node and/or the like). For example, as shown by reference number 506 (which shows what may be referred to as Split Option 9), the repeater may perform analog beamforming on the incoming signal, and may provide an analog signal to the Tx chain 502. The repeater may then perform analog beamforming on the analog signal to transmit the outgoing signal to the receiving device. In this case, the repeater may be configured as an analog repeater.

Additionally, or alternatively, the repeater may be configured as a digital repeater, in which case the repeater may further process the incoming signal. For example, as shown by reference number 508 (which shows what may be referred to as Split Option 8), the repeater may process the analog signal by converting the incoming signal from the analog domain to the digital domain using an analog to digital converter (ADC) to determine time domain IQ samples associated with the incoming signal. Accordingly, in some examples, the repeater may process the time domain IQ samples using a digital to analog converter (DAC) to regenerate the analog signal, which is then transmitted using analog beamforming.

Additionally, or alternatively, as shown by reference number 510 (which shows what may be referred to as Split Option 7-1), the repeater may further process the incoming signal to determine frequency domain IQ samples associated with the incoming signal by removing a cyclic prefix (CP) from the time domain IQ samples and performing an FFT. In this case, the repeater may generate the outgoing signal by then performing an iFFT on the frequency domain IQ samples and adding a CP to obtain time domain IQ samples, converting the time domain IQ samples to an analog signal using a DAC, and transmitting the analog signal using analog beamforming.

Additionally, or alternatively, as shown by reference number 512 (which shows what may be referred to as Split Option 7-2), the repeater may further process the incoming signal to determine symbols per antenna (e.g., IQ symbols of occupied tones) associated with the incoming signal. For example, the repeater may perform a digital beamforming process on the frequency domain IQ samples (e.g., based at least in part on a digital Tx beamforming configuration), and may further perform an RE demapping based at least in part on an RE mapping configuration received by the repeater to identify REs of the incoming signal and/or occupied tones. The repeater may generate the outgoing signal by processing the symbols per antenna (e.g., IQ symbols of occupied tones) using an RE mapping and digital beamforming information.

Additionally, or alternatively, as shown by reference number 514 (which shows what may be referred to as Split Option 7-3), the repeater may further process the incoming signal to determine a codeword (e.g., log likelihood ratio (LLR) values and/or the like) associated with the incoming signal. For example, the repeater may determine the codeword by performing channel estimation and channel equalization on the IQ symbols of occupied tones (e.g., to identify and/or remove noise associated with the incoming signal) and by performing a demodulation procedure on the incoming signal. In this case, the repeater may generate the outgoing signal by modulating the codeword, performing a layer mapping, applying pre-coding, performing an RE mapping, performing digital Tx beamforming, applying an iFFT and/or adding a CP, converting the signal from the digital domain to the analog domain using a DAC, and performing analog beamforming to transmit the outgoing signal.

Additionally, or alternatively, as shown by reference number 516 (which shows what may be referred to as Split Option 6), the repeater may further process the incoming signal to obtain a transport block associated with the incoming signal (e.g., the repeater may fully decode the incoming signal). For example, the repeater may obtain the transport block by descrambling the codeword (e.g., using a scrambling identifier associated with the incoming signal) and decoding the descrambled codeword (e.g., based at least in part on an MCS associated with the incoming signal). In this case, the repeater may generate the outgoing signal by encoding the transport block according to a Tx MCS, scrambling the encoded transport block to regenerate the codeword, modulating the codeword and performing a layer mapping and pre-coding to regenerate the symbols per antenna, performing an RE mapping and digital Tx beamforming to regenerate the frequency domain IQ samples, applying an iFFT and/or adding a CP to the frequency domain IQ samples to regenerate the time domain IQ samples, converting the time domain IQ samples from the digital domain to the analog domain with a DAC, and performing analog beamforming on the analog signal in the analog domain to transmit the outgoing signal.

In some examples, the level of processing that the repeater performs on the incoming signal may be configured by a control node or another wireless node. The outgoing signal may be a regenerated version of the incoming signal that is based at least in part on the level of processing performed by the repeater.

The number and arrangement of components shown in FIG. 5 is provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally, or alternatively, a set of components (e.g., one or more components) shown in FIG. 5 may perform one or more functions described as being performed by another set of components shown in FIG. 5.

In some networks, repeaters may provide an increased coverage of a network based at least in part on providing added paths for line-of-sight (LoS) channels between nodes of the network and/or based at least in part on amplifying a signal before repeating the signal.

An amplify and forward (A&F) repeater amplifies a received signal in an analog chain and steers the received signal towards a target node (e.g., a UE or another repeater, among other examples). A direction of the steering may be controlled by network node (e.g., gNB, CU, or DU). For example, the network node may transmit an indication of beamforming weights and/or commands to the repeater. The beamforming weights and/or commands may be based at least in part on coverage indicators, such as RSSI and/or RSRP, that the network node receives from target UEs. A&F repeaters may uses analog reception and transmission.

A decode and forward (D&F) repeater decodes a received signal, re-encodes the received signal, and then, like the A&F repeater, steers the signal towards the target node. However, a latency that is introduced by repeater (or sum of latency of multiple hops) has a direct influence on an aggregated latency of a link between the network node and the target node. D&F deployment may not be always feasible based at least in part on the latency. In the alternative, using A&F may lead to reduced link performance and potential RAN requirement violations.

In some aspects described herein, a repeater may support multiple digital processing modes that include one or more impairment correction operations. The multiple digital processing modes may be associated with A&F function or different numbers of digital processing operations that correct errors of the received signal as received by the repeater and/or as introduced by the repeater during digital or analog processing of the received signal.

In some aspects, the number of impairment correction operations may be based at least in part on a tradeoff between latency, which may increase based at least in part on performing the impairment correction operations, and link quality, which may improve based at least in part on performing the impairment correction operations.

In some aspects, the repeater may transmit an indication (e.g., using RRC signaling or medium access control (MAC) signaling) to the network node to indicate support for one or more candidate digital processing modes. The indication may indicate features (e.g., one or more impairment correction operations) of the one or more candidate digital processing modes. For example, the indication may indicate that the repeater supports a first candidate digital processing mode, a second candidate digital processing mode, and an mth candidate digital processing mode. The first candidate digital processing mode may be indicated to include a first feature. The second candidate digital processing mode may be indicated to include the first feature and a second feature. The mth candidate digital processing mode may be indicated to support the second feature, a third feature, and an nth feature.

In some aspects, the network node may transmit (e.g., using MAC signaling and/or control channel signaling) an indication to the repeater of required features and/or performance requirements (e.g., one or more parameters). For example, the network node may indicate that the repeater is to use a candidate digital processing mode that includes the second feature. Additionally, or alternatively, the network node may indicate that, when applying the second feature, the repeater is to comply with one or more requirements. For example, a feature of FDRSB correction may be associated with a threshold amount of interference and/or noise on sidebands, and/or a feature of droop correction may be associated with a threshold amount of residual droop after droop correction, among other examples.

In some aspects, the repeater may transmit an indication (e.g., using MAC signaling and/or control channel signaling) to the network node of latency of the digital processing modes (e.g., each of the candidate digital processing modes) and/or one or more of the features (e.g., based at least in part on performance requirements for the features). In some aspects, the repeater may transmit an update (e.g., using MAC signaling and/or control channel signaling) to the network node of the latency of the digital processing modes and/or the one or more of the features. For example, the repeater may transmit the update based at least in part on a change in conditions, such as temperature and/or time of day, which may cause a change in complexity of digital pre-distortion (DPD) and/or a change in latency.

In some aspects, the network node may transmit an indication (e.g., using MAC signaling and/or control channel signaling) to indicate to the repeater a selection of a digital processing mode and/or one or more features to use for repeating. In some aspects, the network node may transmit different indications (e.g., supporting different selections) to each repeater along a transmission path to a target node (e.g., a UE). In some aspects, the indication may apply to a certain slot (e.g., a-periodic indication), for an amount of time (e.g., periodic and/or time-constrained indication), and/or for a finite number of slots (e.g., semi-persistent-scheduling (SPS)-based indication), among other examples. In some aspects, the indication may include conditions for applying different digital processing modes and/or one or more features to use for repeating communications. For example, the indication may indicate to use a first digital processing mode during first conditions (e.g., time of day and/or temperature range) and to use a second digital processing mode during second conditions (e.g., different time of day and/or different temperature range).

In some aspects, the repeater may transmit (e.g., using RRC signaling and/or MAC signaling) an indication of a maximum delay that the repeater can introduce to the signal (e.g., a maximum time of storage in a buffer of the repeater). In some aspects, the network node may transmit (e.g., using RRC signaling and/or MAC signaling) an indication of a maximum delay that the repeater can introduce to the signal. In some aspects, network node may transmit an indication (e.g., using control channel signaling) of a delay. The indication may be explicit or may be relative to a previous configuration.

In some aspects, the network node may transmit an indication (e.g., using MAC signaling and/or control channel signaling) to the repeater of a digital decoding matrix and/or a digital precoding matrix to use if the digital processing mode includes a change of frequency resources between a received signal and a transmitted signal. For example, the network node may indicate RE re-mapping for subsequent grants and/or communications. In some aspects, the indication may be associated with one or more time constraints, for a limited amount of time (e.g., SPS-based indication), and/or a starting slot and/or symbol. In some aspects, the indication may indicate frequency re-mapping options, such as an indication to move data received at a first set of resources to a second set of resources for transmitting.

Based at least in part on the network node selecting, and the repeater using, a digital processing mode that is selected from a set of candidate digital processing modes, the repeater may repeat communications with a set of impairment correction operations that are selected to optimize performance. For example, the digital processing mode may be selected to balance latency and error correction associated with the repeater.

Figure 6:
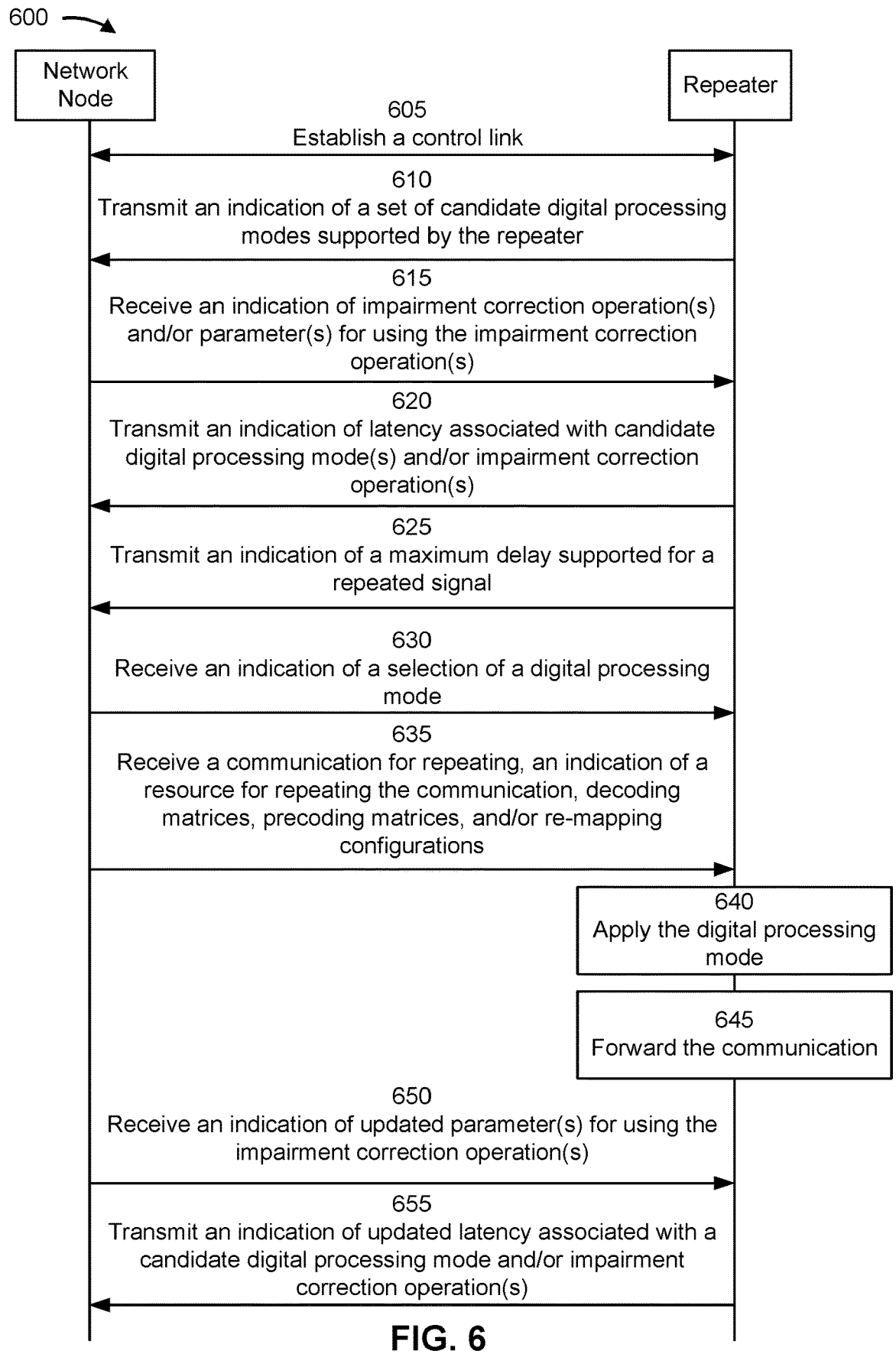
FIG. 6 is a diagram of an example associated with repeater digital processing modes, in accordance with the present disclosure.

FIG. 6 is a diagram of an example 600 associated with repeater digital processing modes, in accordance with the present disclosure. As shown in FIG. 6, a network node (e.g., network node 110, a CU, a DU, and/or an RU) may communicate with a repeater (e.g., a network node 110) and a UE (e.g., UE 120). In some aspects, the network node, the repeater, and the UE may be part of a wireless network (e.g., wireless network 100). The UE, the repeater, and the network node may have established a wireless connection prior to operations shown in FIG. 6. In some aspects, the repeater may be transparent to the UE and the network node may be a controller over the repeater.

As shown by reference number 605, the network node and the repeater may establish a control link. In some aspects, the control link may be a link between a mobile termination unit of the repeater and the network node. In other words, the control link may facilitate communication between the repeater and the network node without the repeater repeating signals received from the network node. In some aspects, the control link may provide a link through which the network node may configure the repeater and/or the repeater may provide information to the network node regarding operations, capabilities, and/or a configuration of the repeater.

As shown by reference number 610, the repeater may transmit, and the network node may receive, an indication of a set of candidate digital processing modes supported by the repeater. The candidate digital processing modes of the set of candidate digital processing modes may be associated with one or more impairment correction operations. In some aspects, the candidate digital processing modes are associated with latencies that are based at least in part on associated impairment correction operations.

In some aspects, the one or more impairment correction operations may include DC offset removal from a received signal, DC offset removal from a transmitted signal, gain control associated with a reception LNA, gain control associated with a transmission LNA, droop correction of the received signal, droop correction of the transmitted signal, FDRSB correction of the received signal, FDRSB correction of the transmitted signal, peak-to-average-peak-ratio reduction of the transmitted signal, or digital pre-distortion correction of the transmitted signal, among other examples. For example, the one or more impairment correction operations may include operations that do not involve decoding the communication or mapping received signals to new time and/or frequency resources.

In some aspects, one or more of the candidate digital processing modes are associated with impairment correction operations that include component carrier splitting of the received signal, application of a frequency shift per component carrier of the received signal, downsampling of the received signal, buffering of the received signal, upsampling of the transmitted signal, application of a frequency shift per component carrier of the transmitted signal, and/or component carrier splitting of the transmitted signal, among other examples. In some aspects, one or more of the candidate digital processing modes are associated with impairment correction operations that include notch filtering of the received signal, application of an FFT operation on the received signal, application of a digital beamforming on the received signal, resource element extraction of the received signal, resource element re-mapping of the transmitted signal, application of digital beamforming on the transmitted signal, application of an iFFT operation on the transmitted signal, among other examples.

As shown by reference number 615, the repeater may receive, and the network node may transmit, an indication of one or more impairment correction operations and/or one or more parameters for using the one or more impairment correction operations. In some aspects, the one or more parameters may include minimum performance requirements for performing an impairment correction operation. For example, an impairment correction operation that does not satisfy the minimum performance requirements should not be used because of an increased latency associated with the impairment correction operation.

As shown by reference number 620, the repeater may transmit, and the network node may receive, an indication of latency associated with one or more candidate digital processing modes and/or one or more impairment correction operations. For example, the repeater may transmit an indication of total latency of each of the candidate digital processing modes. Additionally, or alternatively, the repeater may transmit an indication of latencies of individual impairment correction operations. For example, a first indication of latency associated with a first impairment correction operation of the digital processing mode and a second indication of latency associated with a second impairment correction operation of the digital processing mode.

In this way, the network node may balance an advantage of using the candidate digital processing modes and/or the impairment correction operations with a latency caused by using the candidate digital processing modes and/or the impairment correction operations.

As shown by reference number 625, the repeater may transmit, and the network node may receive, an indication of a maximum delay supported for a repeated signal. The maximum delay may be based at least in part on a data buffer of the repeater and/or a capacity for storage of the communication. In some aspects, the maximum delay may be based at least in part on an amount of traffic communicated via the repeater.

As shown by reference number 630, the repeater may receive, and the network node may transmit, an indication of a selection of a digital processing mode. In some aspects, the network node may select the digital processing mode based at least in part on the indication of the maximum delay supported for the repeated signal. In some aspects, the network node may select the digital processing mode based at least in part on a signal-to-noise ratio (SNR) associated with reception of the one or more communications from a parent node (e.g., with the network node or an additional repeater). In some aspects, the network node may select the digital processing mode based at least in part on a channel between the repeater and a parent node, and is based at least in part on a channel between the repeater and a child node.

In some aspects, the selection of the digital processing mode may be applied to communications received within multiple slots based at least in part on an indication of the multiple slots, the multiple slots being within a time window from receiving the indication of the selection, and/or the multiple slots being periodic resources, among other examples. In some aspects, the selection of the digital processing mode applies to communications received during indicated conditions (e.g., time periods, times of day, periodic time resources, and/or temperature ranges, among other examples).

In some aspects, the indication of the selection may apply to the repeater and an additional processing mode, that is different from the digital processing mode, applies to an additional repeater along a transmission path of the one or more communications. In this way, the network node may configure different repeaters with different digital processing modes. For example, a repeater with a low reception quality may improve communication errors by performing additional impairment correction operations than a repeater with high reception quality, for which error correction may be unnecessary. Additionally, or alternatively, the network node may select different digital processing modes based at least in part on power constraints of the different repeaters (e.g., with different types of power supply, such as solar and/or other energy harvesting or a connection to a power grid).

As shown by reference number 635, the repeater may receive, and the network node may transmit, a communication for repeating, an indication of a resource for repeating the communication, decoding matrices, precoding matrices, and/or re-mapping configurations. In some aspects, the In some aspects, the digital processing mode may include repeating the communication using different frequency resources. For this communication, the network node may transmit an indication of digital decoding matrices (e.g., for receiving the communication from the network node), an indication of digital precoding matrices (e.g., for transmitting the communication), and/or an indication of resource element mapping (e.g., for re-mapping the communication to resources elements), among other examples.

As shown by reference number 640, the repeater may apply the digital processing mode. For example, the repeater may perform one or more impairment correction operations associated with the digital processing mode.

As shown by reference number 645, the repeater may forward the communication (e.g., to a UE). For example, the repeater may forward the communication using the same resources as those used to receive the communication (e.g., nearly immediate repeating) or may delay transmission and/or move the communication to different frequency resources.

As shown by reference number 650, the repeater may receive, and the network node may transmit, an indication of one or more updated parameters for using the one or more impairment correction operations. For example, the network node may update the one or more parameters described in connection with reference number 615 based at least in part on a change in conditions (e.g., changes of a physical environment, weather, and/or traffic, among other examples).

As shown by reference number 655, the repeater may transmit, and the network node may receive, an indication of updated latency associated with a candidate digital processing mode and/or one or more impairment correction operations.

Based at least in part on the network node selecting, and the repeater using, a digital processing mode that is selected from a set of candidate digital processing modes, the repeater may repeat communications with a set of impairment correction operations that are selected to optimize performance. For example, the digital processing mode may be selected to balance latency and error correction associated with the repeater.

As indicated above, FIG. 6 is provided as an example. Other examples may differ from what is described with respect to FIG. 6.

Figure 7:
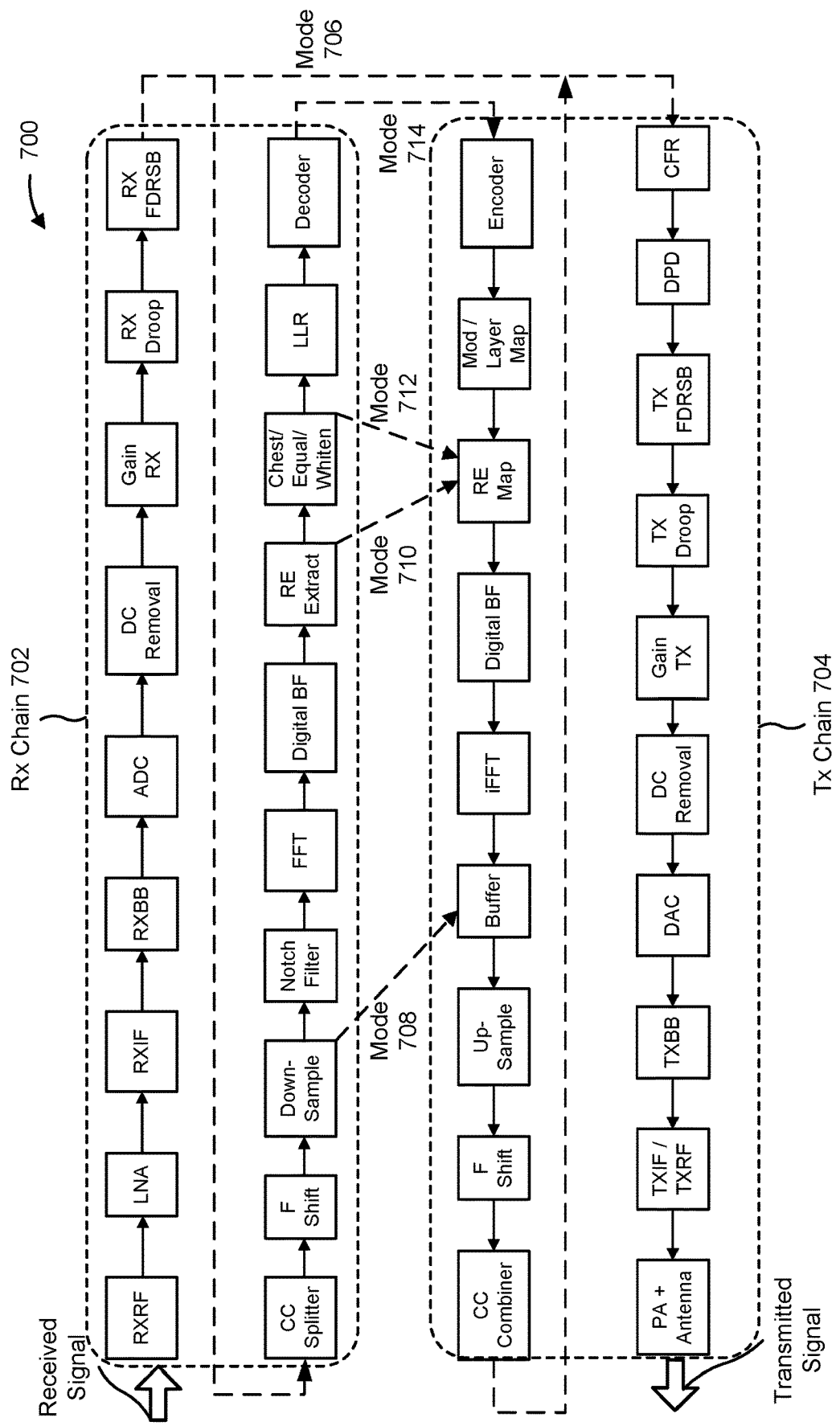
FIG. 7 is a diagram illustrating an example of a Tx chain and an Rx chain of a repeater, in accordance with the present disclosure.

FIG. 7 is a diagram illustrating an example 700 of a Tx chain 702 and an Rx chain 704 of a repeater, in accordance with the present disclosure. The boxes of FIG. 7 may represent impairment correction operations of digital processing modes.

As shown in FIG. 7, a digital processing mode 706 may be associated with impairment correction operations that include applying a reception RF (RXRF), applying a LNA, applying a reception intermediate frequency converter (RXIF), applying a reception baseband frequency converter (RXBB), applying an ADC, applying a direct current offset removal (DC removal), applying a gain receiver (gain RX), applying a receiver droop correction (RX droop), and/or applying a receiver FDRSB.

The DC removal may correct a DC offset from the ADC. The gain RX may correct a gain (e.g., add gain) to the output of the LNA. The RX droop may correct a droop introduced by the RXRF, the RXIF, and/or the RXBB. The droop may include a frequency-dependent analog response error.

Digital processing mode 706 may include providing a signal (e.g., a received signal) from the RX FDRSB to a crest factor reducer (CFR) that reduces a peak-to-average-power-ratio of the signal (a transmitted signal once in the Tx chain 704). A DPD corrector may apply a function to the signal to correct for distortion to be caused by a power amplifier (PA). The repeater may then apply a TX FDRSB, a TX droop correction, a gain RX, a DC removal, a DAC, a transmission baseband frequency converter (TXBB), a transmission intermediate frequency converter (TXIF), a transmission RF converter (TXRF), and/or a PA and antenna (to transmit the signal over RF).

The TX FDRSB may correct sideband interference created by the TXBB, the TX droop may correct droop to be caused by the TXBB, the TXIF, and/or the TXRF. The gain RX may correct a gain (e.g., add gain) before providing the signal to the PA. The DC removal may correct a DC offset from the DAC.

Some modes may include additional impairment correction operations. For example, mode 708 includes operations to change time resources of the transmitted signal (e.g., relative to the received signal). The operations may include applying a component carrier splitter (CC splitter) to split a received signal into respected component carriers, applying a frequency shift (F shift) to shift the received signal over in time (e.g., on the same frequency resources) for transmission, and applying downsampling to the received signal. The repeater may then apply a buffer to store the received signal before transmission, an up-sample, a frequency shift, and a component carrier combiner before providing the signal to the CFR.

A mode 710 may include applying a notch filter to cure spurs in the received signal in the frequency domain, a FFT, a digital beamforming (BF), and a resource element extraction (RE extract). The Rx chain 702 may provide time domain IQ samples to the Tx chain 704, which may apply an RE mapper (RE map) a digital BF, and an iFFT. A mode 712 may further apply a channel estimation (Chest), equalizer (equal), and/or whitener (whiten) to the input signal before providing the received signal to the RE mapper.

A mode 714 may include applying an LLR and a decoder to the received signal. The Rx chain 702 may then provide uncoded bits to the Tx chain 704 at an encoder to re-encode the bits and then apply a modulator (Mod) and layer mapping (layer map) to the transmitted signal.

FIG. 7 shows several example impairment correction operations associated with different digital beam processing modes. Although shown as divided into modes 706, 708, 710, 712, and 714, the impairment correction operations may be combined into different combinations not shown.

As indicated above, FIG. 7 is provided as an example. Other examples may differ from what is described with respect to FIG. 7.

Figure 8:
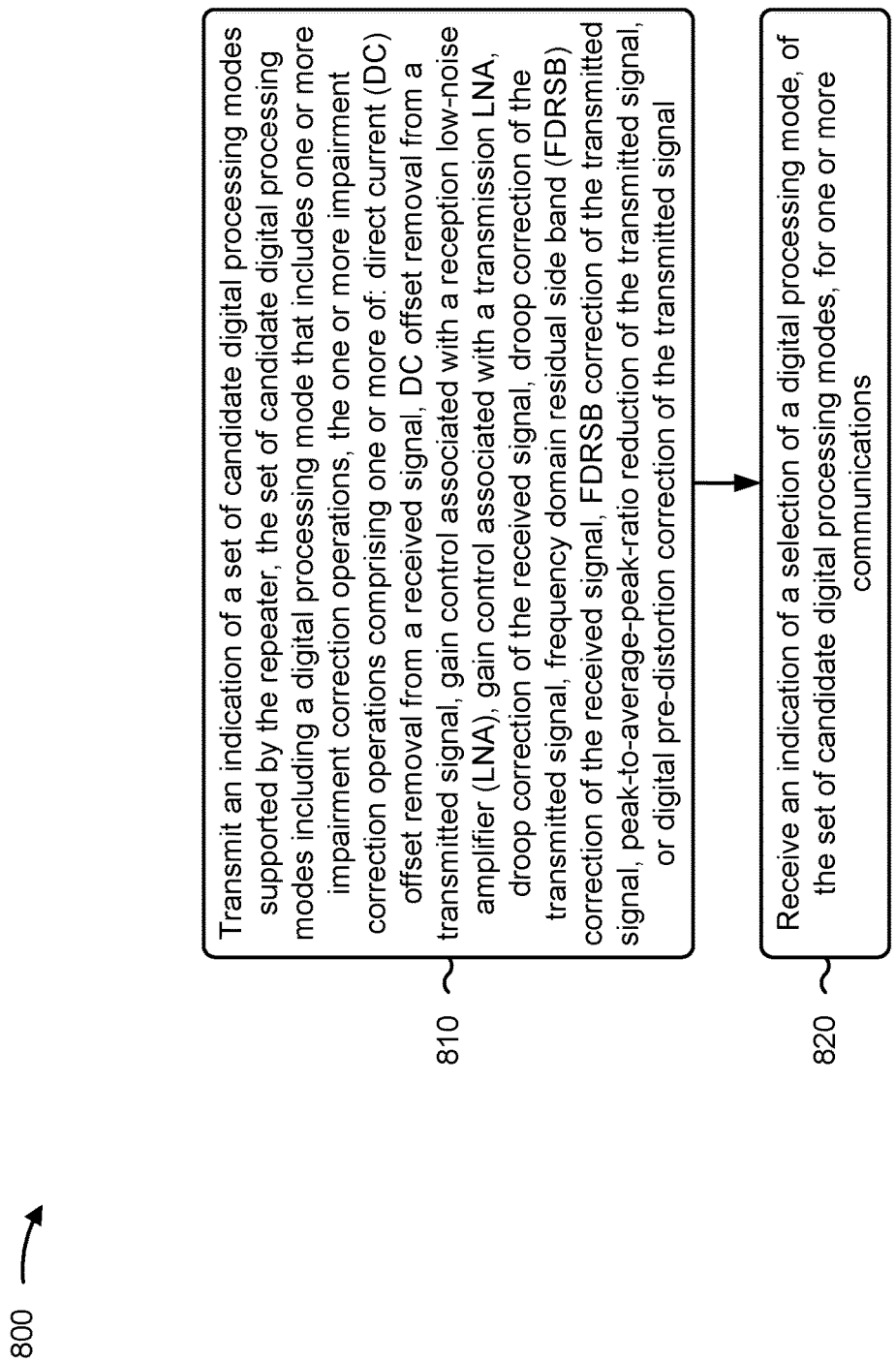
FIG. 8 is a diagram illustrating an example process performed, for example, by a repeater, in accordance with the present disclosure.

FIG. 8 is a diagram illustrating an example process 800 performed, for example, by a repeater, in accordance with the present disclosure. Example process 800 is an example where the repeater (e.g., network node 110) performs operations associated with repeater digital processing modes.

As shown in FIG. 8, in some aspects, process 800 may include transmitting an indication of a set of candidate digital processing modes supported by the repeater, the set of candidate digital processing modes including a digital processing mode that includes one or more impairment correction operations, the one or more impairment correction operations comprising one or more of: DC offset removal from a received signal, DC offset removal from a transmitted signal, gain control associated with a reception LNA, gain control associated with a transmission LNA, droop correction of the received signal, droop correction of the transmitted signal, FDRSB correction of the received signal, FDRSB correction of the transmitted signal, peak-to-average-peak-ratio reduction of the transmitted signal, or digital pre-distortion correction of the transmitted signal (block 810). For example, the repeater (e.g., using communication manager 140 and/or transmission component 1004, depicted in FIG. 10) may transmit an indication of a set of candidate digital processing modes supported by the repeater, the set of candidate digital processing modes including a digital processing mode that includes one or more impairment correction operations, the one or more impairment correction operations comprising one or more of: DC offset removal from a received signal, DC offset removal from a transmitted signal, gain control associated with a reception LNA, gain control associated with a transmission LNA, droop correction of the received signal, droop correction of the transmitted signal, FDRSB correction of the received signal, FDRSB correction of the transmitted signal, peak-to-average-peak-ratio reduction of the transmitted signal, or digital pre-distortion correction of the transmitted signal, as described above.

As further shown in FIG. 8, in some aspects, process 800 may include receiving an indication of a selection of a digital processing mode, of the set of candidate digital processing modes, for one or more communications (block 820). For example, the repeater (e.g., using communication manager 140 and/or reception component 1002, depicted in FIG. 10) may receive an indication of a selection of a digital processing mode, of the set of candidate digital processing modes, for one or more communications, as described above.

Process 800 may include additional aspects, such as any single aspect or any combination of aspects described below and/or in connection with one or more other processes described elsewhere herein.

In a first aspect, process 800 includes receiving an indication of one or more parameters for using impairment correction operations of the digital processing mode.

In a second aspect, alone or in combination with the first aspect, process 800 includes transmitting an indication of a latency associated with the digital processing mode based at least in part on the one or more parameters.

In a third aspect, alone or in combination with one or more of the first and second aspects, the indication of the latency comprises a first indication of latency associated with a first impairment correction operation of the digital processing mode, and a second indication of latency associated with a second impairment correction operation of the digital processing mode.

In a fourth aspect, alone or in combination with one or more of the first through third aspects, process 800 includes transmitting an update to the latency associated with the digital processing mode.

In a fifth aspect, alone or in combination with one or more of the first through fourth aspects, process 800 includes receiving an update to the one or more parameters for using impairment correction operations of the digital processing mode.

In a sixth aspect, alone or in combination with one or more of the first through fifth aspects, the digital processing mode applies to the repeater, and wherein an additional processing mode, that is different from the digital processing mode, applies to an additional repeater along a transmission path of the one or more communications.

In a seventh aspect, alone or in combination with one or more of the first through sixth aspects, the digital processing mode applies to communications received within multiple slots based at least in part on an indication of the multiple slots, the multiple slots being within a time window from receiving the indication of the selection, or the multiple slots being periodic resources.

In an eighth aspect, alone or in combination with one or more of the first through seventh aspects, the selection of the digital processing mode applies to communications received during indicated conditions.

In a ninth aspect, alone or in combination with one or more of the first through eighth aspects, process 800 includes transmitting an indication of a maximum permissible delay for forwarding a communication, the maximum permissible delay associated with the digital processing mode.

In a tenth aspect, alone or in combination with one or more of the first through ninth aspects, process 800 includes receiving one or more of an indication of digital decoding matrices, an indication of digital precoding matrices, or an indication of resource element mapping.

In an eleventh aspect, alone or in combination with one or more of the first through tenth aspects, the digital processing mode includes one or more of carrier splitting of the received signal, application of a frequency shift per component carrier of the received signal, downsampling of the received signal, buffering of the received signal, upsampling of the transmitted signal, application of a frequency shift per component carrier of the transmitted signal, or carrier splitting of the transmitted signal.

In a twelfth aspect, alone or in combination with one or more of the first through eleventh aspects, the one or more impairment correction operations comprise one or more of notching filtering of the received signal, application of a FFT operation on the received signal, application of a digital beamforming on the received signal, element extraction of the received signal, element re-mapping of the transmitted signal, application of digital beamforming on the transmitted signal, application of an iFFT operation on the transmitted signal.

In a thirteenth aspect, alone or in combination with one or more of the first through twelfth aspects, the selection of the digital processing mode is based at least in part on an SNR associated with reception of the one or more communications from a parent node.

In a fourteenth aspect, alone or in combination with one or more of the first through thirteenth aspects, the selection of the digital processing mode is based at least in part on a channel between the repeater and a parent node, and is based at least in part on a channel between the repeater and a child node.

In a fifteenth aspect, alone or in combination with one or more of the first through fourteenth aspects, candidate digital processing modes, of the set of candidate digital processing modes, are associated with latencies that are based at least in part on associated impairment correction operations.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
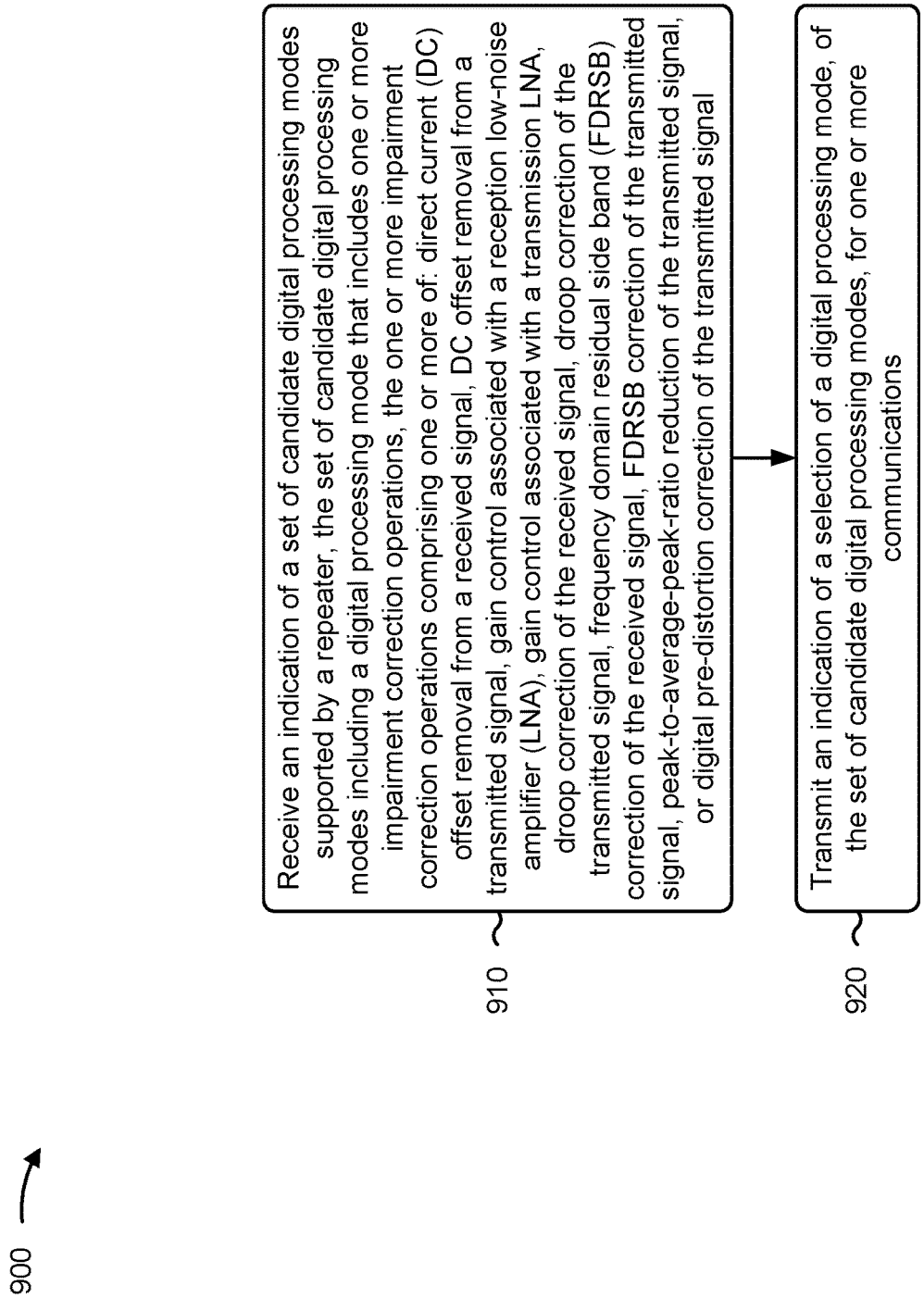
FIG. 9 is a diagram illustrating an example process performed, for example, by a network node, in accordance with the present disclosure.

FIG. 9 is a diagram illustrating an example process 900 performed, for example, by a network node, in accordance with the present disclosure. Example process 900 is an example where the network node (e.g., network node 110) performs operations associated with repeater digital processing modes.

As shown in FIG. 9, in some aspects, process 900 may include receiving an indication of a set of candidate digital processing modes supported by a repeater, the set of candidate digital processing modes including a digital processing mode that includes one or more impairment correction operations, the one or more impairment correction operations comprising one or more of: DC offset removal from a received signal, DC offset removal from a transmitted signal, gain control associated with a reception LNA, gain control associated with a transmission LNA, droop correction of the received signal, droop correction of the transmitted signal, FDRSB correction of the received signal, FDRSB correction of the transmitted signal, peak-to-average-peak-ratio reduction of the transmitted signal, or digital pre-distortion correction of the transmitted signal (block 910). For example, the network node (e.g., using communication manager 150 and/or reception component 1102, depicted in FIG. 11) may receive an indication of a set of candidate digital processing modes supported by a repeater, the set of candidate digital processing modes including a digital processing mode that includes one or more impairment correction operations, the one or more impairment correction operations comprising one or more of: DC offset removal from a received signal, DC offset removal from a transmitted signal, gain control associated with a reception LNA, gain control associated with a transmission LNA, droop correction of the received signal, droop correction of the transmitted signal, FDRSB correction of the received signal, FDRSB correction of the transmitted signal, peak-to-average-peak-ratio reduction of the transmitted signal, or digital pre-distortion correction of the transmitted signal, as described above.

As further shown in FIG. 9, in some aspects, process 900 may include transmitting an indication of a selection of a digital processing mode, of the set of candidate digital processing modes, for one or more communications (block 920). For example, the network node (e.g., using communication manager 150 and/or transmission component 1104, depicted in FIG. 11) may transmit an indication of a selection of a digital processing mode, of the set of candidate digital processing modes, for one or more communications, as described above.

Process 900 may include additional aspects, such as any single aspect or any combination of aspects described below and/or in connection with one or more other processes described elsewhere herein.

In a first aspect, process 900 includes transmitting an indication of one or more parameters for using impairment correction operations of the digital processing mode.

In a second aspect, alone or in combination with the first aspect, process 900 includes receiving an indication of a latency associated with the digital processing mode based at least in part on the one or more parameters.

In a third aspect, alone or in combination with one or more of the first and second aspects, the indication of the latency comprises a first indication of latency associated with a first impairment correction operation of the digital processing mode, and a second indication of latency associated with a second impairment correction operation of the digital processing mode.

In a fourth aspect, alone or in combination with one or more of the first through third aspects, process 900 includes receiving an update to the latency associated with the digital processing mode.

In a fifth aspect, alone or in combination with one or more of the first through fourth aspects, process 900 includes transmitting an update to the one or more parameters for using impairment correction operations of the digital processing mode.

In a sixth aspect, alone or in combination with one or more of the first through fifth aspects, the digital processing mode applies to the repeater, and wherein an additional processing mode, that is different from the digital processing mode, applies to an additional repeater along a transmission path of the one or more communications.

In a seventh aspect, alone or in combination with one or more of the first through sixth aspects, the digital processing mode applies to communications received within multiple slots based at least in part on an indication of the multiple slots, the multiple slots being within a time window from receiving the indication of the selection, or the multiple slots being periodic resources.

In an eighth aspect, alone or in combination with one or more of the first through seventh aspects, the selection of the digital processing mode applies to communications received during indicated conditions.

In a ninth aspect, alone or in combination with one or more of the first through eighth aspects, process 900 includes receiving an indication of a maximum permissible delay for forwarding a communication, the maximum permissible delay associated with the digital processing mode.

In a tenth aspect, alone or in combination with one or more of the first through ninth aspects, process 900 includes transmitting one or more of an indication of digital decoding matrices, an indication of digital precoding matrices, or an indication of resource element mapping.

In an eleventh aspect, alone or in combination with one or more of the first through tenth aspects, the digital processing mode includes one or more of carrier splitting of the received signal, application of a frequency shift per component carrier of the received signal, downsampling of the received signal, buffering of the received signal, upsampling of the transmitted signal, application of a frequency shift per component carrier of the transmitted signal, or carrier splitting of the transmitted signal.

In a twelfth aspect, alone or in combination with one or more of the first through eleventh aspects, the one or more impairment correction operations comprise one or more of notching filtering of the received signal, application of a FFT operation on the received signal, application of a digital beamforming on the received signal, element extraction of the received signal, element re-mapping of the transmitted signal, application of digital beamforming on the transmitted signal, application of an iFFT operation on the transmitted signal.

In a thirteenth aspect, alone or in combination with one or more of the first through twelfth aspects, the selection of the digital processing mode is based at least in part on an SNR associated with reception of the one or more communications from a parent node.

In a fourteenth aspect, alone or in combination with one or more of the first through thirteenth aspects, the selection of the digital processing mode is based at least in part on a channel between the repeater and a parent node, and is based at least in part on a channel between the repeater and a child node.

In a fifteenth aspect, alone or in combination with one or more of the first through fourteenth aspects, candidate digital processing modes, of the set of candidate digital processing modes, are associated with latencies that are based at least in part on associated impairment correction operations.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
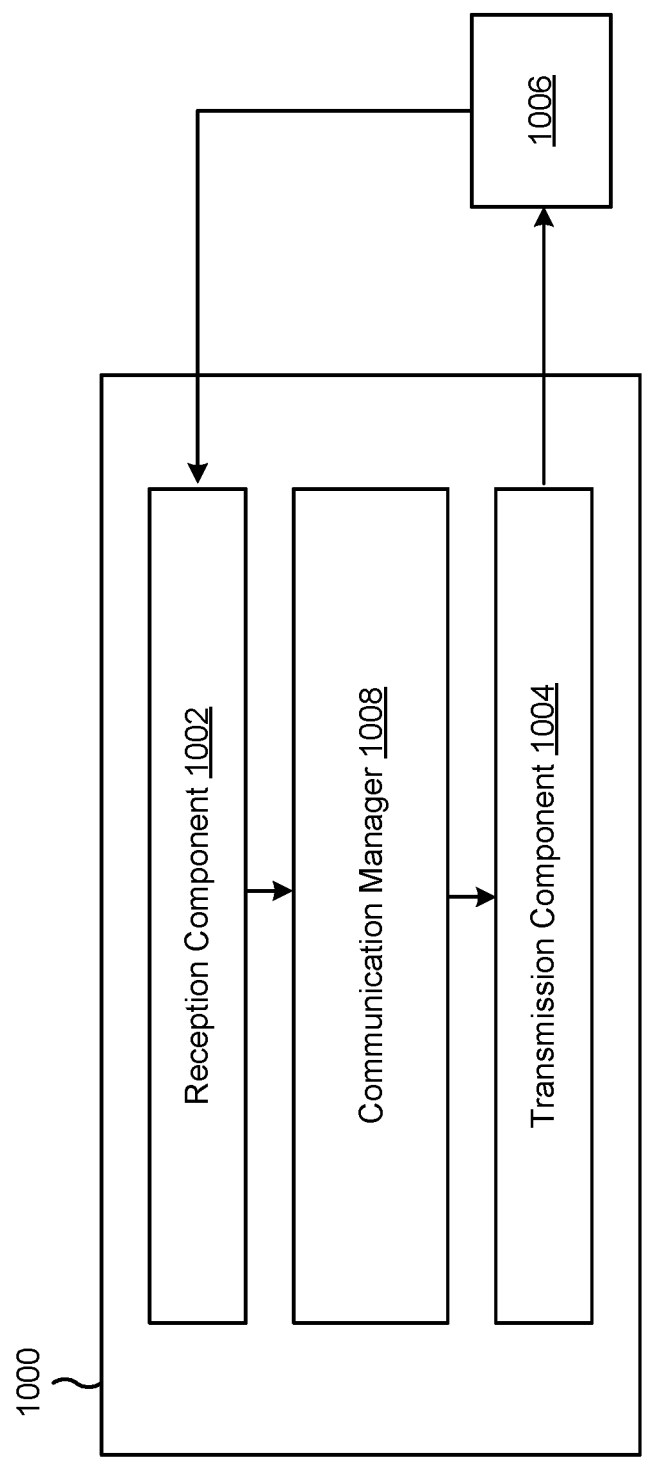
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a repeater, or a repeater may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008 (e.g., the communication manager 140).

In some aspects, the apparatus 1000 may be configured to perform one or more operations described herein in connection with FIGS. 6-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the repeater described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the repeater described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the repeater described in connection with FIG. 2. In some aspects, the transmission component 1004 may be co-located with the reception component 1002 in a transceiver.

The transmission component 1004 may transmit an indication of a set of candidate digital processing modes supported by the repeater, the set of candidate digital processing modes including a digital processing mode that includes one or more impairment correction operations, the one or more impairment correction operations comprising one or more of: DC offset removal from a received signal, DC offset removal from a transmitted signal, gain control associated with a reception LNA, gain control associated with a transmission LNA, droop correction of the received signal, droop correction of the transmitted signal, FDRSB correction of the received signal, FDRSB correction of the transmitted signal, peak-to-average-peak-ratio reduction of the transmitted signal, or digital pre-distortion correction of the transmitted signal. The reception component 1002 may receive an indication of a selection of a digital processing mode, of the set of candidate digital processing modes, for one or more communications.

The reception component 1002 may receive an indication of one or more parameters for using impairment correction operations of the digital processing mode.

The transmission component 1004 may transmit an indication of a latency associated with the digital processing mode based at least in part on the one or more parameters.

The transmission component 1004 may transmit an update to the latency associated with the digital processing mode.

The reception component 1002 may receive an update to the one or more parameters for using impairment correction operations of the digital processing mode.

The transmission component 1004 may transmit an indication of a maximum permissible delay for forwarding a communication, the maximum permissible delay associated with the digital processing mode.

The reception component 1002 may receive one or more of an indication of digital decoding matrices, an indication of digital precoding matrices, or an indication of resource element mapping.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
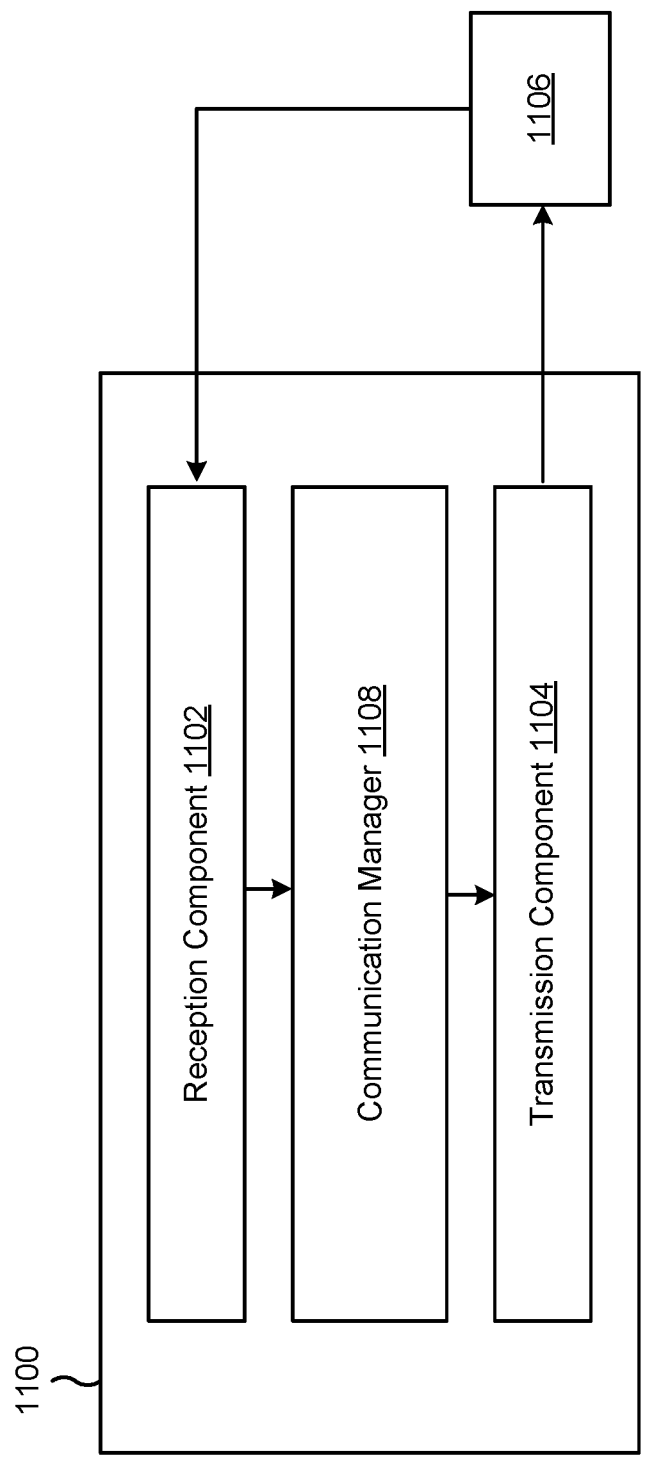
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a communication manager 1018 (e.g., the communication manager 150).

In some aspects, the apparatus 1100 may be configured to perform one or more operations described herein in connection with FIGS. 6-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The reception component 1102 may receive an indication of a set of candidate digital processing modes supported by a repeater, the set of candidate digital processing modes including a digital processing mode that includes one or more impairment correction operations, the one or more impairment correction operations comprising one or more of: DC offset removal from a received signal, DC offset removal from a transmitted signal, gain control associated with a reception LNA, gain control associated with a transmission LNA, droop correction of the received signal, droop correction of the transmitted signal, FDRSB correction of the received signal, FDRSB correction of the transmitted signal, peak-to-average-peak-ratio reduction of the transmitted signal, or digital pre-distortion correction of the transmitted signal. The transmission component 1104 may transmit an indication of a selection of a digital processing mode, of the set of candidate digital processing modes, for one or more communications.

The transmission component 1104 may transmit an indication of one or more parameters for using impairment correction operations of the digital processing mode.

The reception component 1102 may receive an indication of a latency associated with the digital processing mode based at least in part on the one or more parameters.

The reception component 1102 may receive an update to the latency associated with the digital processing mode.

The transmission component 1104 may transmit an update to the one or more parameters for using impairment correction operations of the digital processing mode.

The reception component 1102 may receive an indication of a maximum permissible delay for forwarding a communication, the maximum permissible delay associated with the digital processing mode.

The transmission component 1104 may transmit one or more of an indication of digital decoding matrices, an indication of digital precoding matrices, or an indication of resource element mapping.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a repeater, comprising: transmitting an indication of a set of candidate digital processing modes supported by the repeater, the set of candidate digital processing modes including a digital processing mode that includes one or more impairment correction operations, the one or more impairment correction operations comprising one or more of: direct current (DC) offset removal from a received signal, DC offset removal from a transmitted signal, gain control associated with a reception low-noise amplifier (LNA), gain control associated with a transmission LNA, droop correction of the received signal, droop correction of the transmitted signal, frequency domain residual side band (FDRSB) correction of the received signal, FDRSB correction of the transmitted signal, peak-to-average-peak-ratio reduction of the transmitted signal, or digital pre-distortion correction of the transmitted signal; and receiving an indication of a selection of a digital processing mode, of the set of candidate digital processing modes, for one or more communications.

Aspect 2: The method of Aspect 1, further comprising: receiving an indication of one or more parameters for using impairment correction operations of the digital processing mode.

Aspect 3: The method of Aspect 2, further comprising: transmitting an indication of a latency associated with the digital processing mode based at least in part on the one or more parameters.

Aspect 4: The method of Aspect 3, wherein the indication of the latency comprises: a first indication of latency associated with a first impairment correction operation of the digital processing mode, and a second indication of latency associated with a second impairment correction operation of the digital processing mode.

Aspect 5: The method of any of Aspects 3-4, further comprising: transmitting an update to the latency associated with the digital processing mode.

Aspect 6: The method of any of Aspects 2-5, further comprising: receiving an update to the one or more parameters for using impairment correction operations of the digital processing mode.

Aspect 7: The method of any of Aspects 1-6, wherein the digital processing mode applies to the repeater, and wherein an additional processing mode, that is different from the digital processing mode, applies to an additional repeater along a transmission path of the one or more communications.

Aspect 8: The method of any of Aspects 1-7, wherein the digital processing mode applies to communications received within multiple slots based at least in part on: an indication of the multiple slots, the multiple slots being within a time window from receiving the indication of the selection, or the multiple slots being periodic resources.

Aspect 9: The method of any of Aspects 1-8, wherein the selection of the digital processing mode applies to communications received during indicated conditions.

Aspect 10: The method of any of Aspects 1-9, further comprising: transmitting an indication of a maximum permissible delay for forwarding a communication, the maximum permissible delay associated with the digital processing mode.

Aspect 11: The method of any of Aspects 1-10, further comprising receiving one or more of: an indication of digital decoding matrices, an indication of digital precoding matrices, or an indication of resource element mapping.

Aspect 12: The method of any of Aspects 1-11, wherein the digital processing mode includes one or more of: component carrier splitting of the received signal, application of a frequency shift per component carrier of the received signal, downsampling of the received signal, buffering of the received signal, upsampling of the transmitted signal, application of a frequency shift per component carrier of the transmitted signal, or component carrier splitting of the transmitted signal.

Aspect 13: The method of any of Aspects 1-12, wherein the one or more impairment correction operations comprise one or more of: notch filtering of the received signal, application of a fast Fourier transform (FFT) operation on the received signal, application of a digital beamforming on the received signal, resource element extraction of the received signal, resource element re-mapping of the transmitted signal, application of digital beamforming on the transmitted signal, application of an inverse fast Fourier transform (iFFT) operation on the transmitted signal.

Aspect 14: The method of any of Aspects 1-13, wherein the selection of the digital processing mode is based at least in part on a signal-to-noise ratio (SNR) associated with reception of the one or more communications from a parent node.

Aspect 15: The method of any of Aspects 1-14, wherein the selection of the digital processing mode is based at least in part on a channel between the repeater and a parent node, and is based at least in part on a channel between the repeater and a child node.

Aspect 16: The method of any of Aspects 1-15, wherein candidate digital processing modes, of the set of candidate digital processing modes, are associated with latencies that are based at least in part on associated impairment correction operations.

Aspect 17: A method of wireless communication performed by a network node, comprising: receiving an indication of a set of candidate digital processing modes supported by a repeater, the set of candidate digital processing modes including a digital processing mode that includes one or more impairment correction operations, the one or more impairment correction operations comprising one or more of: direct current (DC) offset removal from a received signal, DC offset removal from a transmitted signal, gain control associated with a reception low-noise amplifier (LNA), gain control associated with a transmission LNA, droop correction of the received signal, droop correction of the transmitted signal, frequency domain residual side band (FDRSB) correction of the received signal, FDRSB correction of the transmitted signal, peak-to-average-peak-ratio reduction of the transmitted signal, or digital pre-distortion correction of the transmitted signal; and transmitting an indication of a selection of a digital processing mode, of the set of candidate digital processing modes, for one or more communications.

Aspect 18: The method of Aspect 17, further comprising: transmitting an indication of one or more parameters for using impairment correction operations of the digital processing mode.

Aspect 19: The method of Aspect 18, further comprising: receiving an indication of a latency associated with the digital processing mode based at least in part on the one or more parameters.

Aspect 20: The method of Aspect 19, wherein the indication of the latency comprises: a first indication of latency associated with a first impairment correction operation of the digital processing mode, and a second indication of latency associated with a second impairment correction operation of the digital processing mode.

Aspect 21: The method of any of Aspects 19-20, further comprising: receiving an update to the latency associated with the digital processing mode.

Aspect 22: The method of any of Aspects 18-21, further comprising: transmitting an update to the one or more parameters for using impairment correction operations of the digital processing mode.

Aspect 23: The method of any of Aspects 17-22, wherein the digital processing mode applies to the repeater, and wherein an additional processing mode, that is different from the digital processing mode, applies to an additional repeater along a transmission path of the one or more communications.

Aspect 24: The method of any of Aspects 17-23, wherein the digital processing mode applies to communications received within multiple slots based at least in part on: an indication of the multiple slots, the multiple slots being within a time window from receiving the indication of the selection, or the multiple slots being periodic resources.

Aspect 25: The method of any of Aspects 17-24, wherein the selection of the digital processing mode applies to communications received during indicated conditions.

Aspect 26: The method of any of Aspects 17-25, further comprising: receiving an indication of a maximum permissible delay for forwarding a communication, the maximum permissible delay associated with the digital processing mode.

Aspect 27: The method of any of Aspects 17-26, further comprising transmitting one or more of: an indication of digital decoding matrices, an indication of digital precoding matrices, or an indication of resource element mapping.

Aspect 28: The method of Aspect 17, wherein the digital processing mode includes one or more of: component carrier splitting of the received signal, application of a frequency shift per component carrier of the received signal, downsampling of the received signal, buffering of the received signal, upsampling of the transmitted signal, application of a frequency shift per component carrier of the transmitted signal, or component carrier splitting of the transmitted signal.

Aspect 29: The method of any of Aspects 17-28, wherein the one or more impairment correction operations comprise one or more of: notch filtering of the received signal, application of a fast Fourier transform (FFT) operation on the received signal, application of a digital beamforming on the received signal, resource element extraction of the received signal, resource element re-mapping of the transmitted signal, application of digital beamforming on the transmitted signal, application of an inverse fast Fourier transform (iFFT) operation on the transmitted signal.

Aspect 30: The method of any of Aspects 17-29, wherein the selection of the digital processing mode is based at least in part on a signal-to-noise ratio (SNR) associated with reception of the one or more communications from a parent node.

Aspect 31: The method of any of Aspects 17-30, wherein the selection of the digital processing mode is based at least in part on a channel between the repeater and a parent node, and based at least in part on a channel between the repeater and a child node.

Aspect 32: The method of any of Aspects 17-31, wherein candidate digital processing modes, of the set of candidate digital processing modes, are associated with latencies that are based at least in part on associated impairment correction operations.

Aspect 33: An apparatus for wireless communication at a device, comprising a processor; memory coupled with the processor; and instructions stored in the memory and executable by the processor to cause the apparatus to perform the method of one or more of Aspects 1-32.

Aspect 34: A device for wireless communication, comprising a memory and one or more processors coupled to the memory, the one or more processors configured to perform the method of one or more of Aspects 1-32.

Aspect 35: An apparatus for wireless communication, comprising at least one means for performing the method of one or more of Aspects 1-32.

Aspect 36: A non-transitory computer-readable medium storing code for wireless communication, the code comprising instructions executable by a processor to perform the method of one or more of Aspects 1-32.

Aspect 37: A non-transitory computer-readable medium storing a set of instructions for wireless communication, the set of instructions comprising one or more instructions that, when executed by one or more processors of a device, cause the device to perform the method of one or more of Aspects 1-32.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A repeater for wireless communication, comprising:
a memory; and
one or more processors, coupled to the memory, configured to:
transmit an indication of a set of candidate digital processing modes supported by the repeater, the set of candidate digital processing modes including a digital processing mode that includes one or more impairment correction operations, the one or more impairment correction operations comprising one or more of: direct current (DC) offset removal from a received signal, DC offset removal from a transmitted signal, gain control associated with a reception low-noise amplifier (LNA), gain control associated with a transmission LNA, droop correction of the received signal, droop correction of the transmitted signal, frequency domain residual side band (FDRSB) correction of the received signal, FDRSB correction of the transmitted signal, peak-to-average-peak-ratio reduction of the transmitted signal, or digital pre-distortion correction of the transmitted signal;
receive an indication of a selection of a digital processing mode, of the set of candidate digital processing modes, for one or more communications; and
receive an indication of one or more parameters for using impairment correction operations of the digital processing mode.

2. The repeater of claim 1, wherein the one or more processors are further configured to:
transmit an indication of a latency associated with the digital processing mode based at least in part on the one or more parameters.

3. The repeater of claim 2, wherein the indication of the latency comprises:
a first indication of latency associated with a first impairment correction operation of the digital processing mode, and
a second indication of latency associated with a second impairment correction operation of the digital processing mode.

4. The repeater of claim 2, wherein the one or more processors are further configured to:
transmit an update to the latency associated with the digital processing mode.

5. The repeater of claim 1, wherein the one or more processors are further configured to:
receive an update to the one or more parameters for using impairment correction operations of the digital processing mode.

6. The repeater of claim 1, wherein the digital processing mode applies to the repeater, and
wherein an additional processing mode, that is different from the digital processing mode, applies to an additional repeater along a transmission path of the one or more communications.

7. The repeater of claim 1, wherein the digital processing mode applies to communications received within multiple slots based at least in part on:
an indication of the multiple slots,
the multiple slots being within a time window from receiving the indication of the selection, or
the multiple slots being periodic resources.

8. The repeater of claim 1, wherein the selection of the digital processing mode applies to communications received during indicated conditions.

9. The repeater of claim 1, wherein the one or more processors are further configured to:
transmit an indication of a maximum permissible delay for forwarding a communication, the maximum permissible delay associated with the digital processing mode.

10. The repeater of claim 1, wherein the one or more processors are further configured to receive one or more of:
an indication of digital decoding matrices,
an indication of digital precoding matrices, or
an indication of resource element mapping.

11. The repeater of claim 1, wherein the digital processing mode includes one or more of:
component carrier splitting of the received signal,
application of a frequency shift per component carrier of the received signal,
downsampling of the received signal,
buffering of the received signal,
upsampling of the transmitted signal,
application of a frequency shift per component carrier of the transmitted signal, or component carrier splitting of the transmitted signal.

12. The repeater of claim 1, wherein the one or more impairment correction operations comprise one or more of:
notch filtering of the received signal,
application of a fast Fourier transform (FFT) operation on the received signal,
application of a digital beamforming on the received signal,
resource element extraction of the received signal,
resource element re-mapping of the transmitted signal,
application of digital beamforming on the transmitted signal,
application of an inverse fast Fourier transform (iFFT) operation on the transmitted signal.

13. The repeater of claim 1, wherein the selection of the digital processing mode is based at least in part on a signal-to-noise ratio (SNR) associated with reception of the one or more communications from a parent node.

14. The repeater of claim 1, wherein the selection of the digital processing mode is based at least in part on a channel between the repeater and a parent node, and is based at least in part on a channel between the repeater and a child node.

15. The repeater of claim 1, wherein candidate digital processing modes, of the set of candidate digital processing modes, are associated with latencies that are based at least in part on associated impairment correction operations.

16. A network node for wireless communication, comprising:
a memory; and
one or more processors, coupled to the memory, configured to:
receive an indication of a set of candidate digital processing modes supported by a repeater, the set of candidate digital processing modes including a digital processing mode that includes one or more impairment correction operations, the one or more impairment correction operations comprising one or more of: direct current (DC) offset removal from a received signal, DC offset removal from a transmitted signal, gain control associated with a reception low-noise amplifier (LNA), gain control associated with a transmission LNA, droop correction of the received signal, droop correction of the transmitted signal, frequency domain residual side band (FDRSB) correction of the received signal, FDRSB correction of the transmitted signal, peak-to-average-peak-ratio reduction of the transmitted signal, or digital pre-distortion correction of the transmitted signal;
transmit an indication of a selection of a digital processing mode, of the set of candidate digital processing modes, for one or more communications; and
transmit an indication of one or more parameters for using impairment correction operations of the digital processing mode.

17. The network node of claim 16, wherein the digital processing mode applies to the repeater, and
wherein an additional processing mode, that is different from the digital processing mode, applies to an additional repeater along a transmission path of the one or more communications.

18. The network node of claim 16, wherein the digital processing mode applies to communications received within multiple slots based at least in part on:
an indication of the multiple slots,
the multiple slots being within a time window from receiving the indication of the selection, or
the multiple slots being periodic resources.

19. The network node of claim 16, wherein the selection of the digital processing mode applies to communications received during indicated conditions.

20. The network node of claim 16, wherein the one or more processors are further configured to:
receive an indication of a maximum permissible delay for forwarding a communication, the maximum permissible delay associated with the digital processing mode.

21. The network node of claim 16, wherein the one or more processors are further configured to transmit one or more of:
an indication of digital decoding matrices,
an indication of digital precoding matrices, or
an indication of resource element mapping.

22. The network node of claim 16, wherein the digital processing mode includes one or more of:
component carrier splitting of the received signal,
application of a frequency shift per component carrier of the received signal,
downsampling of the received signal,
buffering of the received signal,
upsampling of the transmitted signal,
application of a frequency shift per component carrier of the transmitted signal, or component carrier splitting of the transmitted signal.

23. The network node of claim 16, wherein the one or more impairment correction operations comprise one or more of:
notch filtering of the received signal,
application of a fast Fourier transform (FFT) operation on the received signal,
application of a digital beamforming on the received signal,
resource element extraction of the received signal,
resource element re-mapping of the transmitted signal,
application of digital beamforming on the transmitted signal,
application of an inverse fast Fourier transform (iFFT) operation on the transmitted signal.

24. The network node of claim 16, wherein the selection of the digital processing mode is based at least in part on a signal-to-noise ratio (SNR) associated with reception of the one or more communications from a parent node.

25. The network node of claim 16, wherein the selection of the digital processing mode is based at least in part on a channel between the repeater and a parent node, and is based at least in part on a channel between the repeater and a child node.

26. The network node of claim 16, wherein candidate digital processing modes, of the set of candidate digital processing modes, are associated with latencies that are based at least in part on associated impairment correction operations.

27. A method of wireless communication performed by a repeater, comprising:
transmitting an indication of a set of candidate digital processing modes supported by the repeater, the set of candidate digital processing modes including a digital processing mode that includes one or more impairment correction operations, the one or more impairment correction operations comprising one or more of: direct current (DC) offset removal from a received signal, DC offset removal from a transmitted signal, gain control associated with a reception low-noise amplifier (LNA), gain control associated with a transmission LNA, droop correction of the received signal, droop correction of the transmitted signal, frequency domain residual side band (FDRSB) correction of the received signal, FDRSB correction of the transmitted signal, peak-to-average-peak-ratio reduction of the transmitted signal, or digital pre-distortion correction of the transmitted signal;
receiving an indication of a selection of a digital processing mode, of the set of candidate digital processing modes, for one or more communications; and
receive an indication of one or more parameters for using impairment correction operations of the digital processing mode.

28. A method of wireless communication performed by a network node, comprising:
receiving an indication of a set of candidate digital processing modes supported by a repeater, the set of candidate digital processing modes including a digital processing mode that includes one or more impairment correction operations, the one or more impairment correction operations comprising one or more of: direct current (DC) offset removal from a received signal, DC offset removal from a transmitted signal, gain control associated with a reception low-noise amplifier (LNA), gain control associated with a transmission LNA, droop correction of the received signal, droop correction of the transmitted signal, frequency domain residual side band (FDRSB) correction of the received signal, FDRSB correction of the transmitted signal, peak-to-average-peak-ratio reduction of the transmitted signal, or digital pre-distortion correction of the transmitted signal;

transmitting an indication of a selection of a digital processing mode, of the set of candidate digital processing modes, for one or more communications; and transmit an indication of one or more parameters for using impairment correction operations of the digital processing mode.

* * * * *